United States Patent
Visscher et al.

(10) Patent No.: US 9,744,731 B2
(45) Date of Patent: Aug. 29, 2017

(54) INSTALLATIONS FOR MANUFACTURING BIAXIALLY ORIENTED TUBING AND THE TUBING ITSELF

(71) Applicant: Hoppmann International B.V., Hengelo (NL)

(72) Inventors: Jan Visscher, Lutten (NL); Hendrik Jan Carel Jansen Klomp, Zwolle (NL); Jan-Mark Bosch, Hardenberg (NL)

(73) Assignee: HOPPMANN INTERNATIONAL B.V., Hengelo (NL)

( * ) Notice: Subject to any disclaimer, the term of this patent is extended or adjusted under 35 U.S.C. 154(b) by 502 days.

(21) Appl. No.: 14/542,692

(22) Filed: Nov. 17, 2014

(65) Prior Publication Data
US 2015/0072035 A1 Mar. 12, 2015

Related U.S. Application Data

(62) Division of application No. 13/502,720, filed as application No. PCT/NL2010/050687 on Oct. 18, 2010, now Pat. No. 8,911,660.

(30) Foreign Application Priority Data

Oct. 19, 2009 (NL) .................................... 2003666

(51) Int. Cl.
*B29D 23/00* (2006.01)
*B29C 47/00* (2006.01)
(Continued)

(52) U.S. Cl.
CPC ........ *B29D 23/001* (2013.01); *B29C 47/0019* (2013.01); *B29C 47/0023* (2013.01);
(Continued)

(58) Field of Classification Search
None
See application file for complete search history.

(56) References Cited

U.S. PATENT DOCUMENTS

| 3,249,671 A | 5/1966 | Perrone et al. |
| 3,963,403 A | 6/1976 | Hughes et al. |

(Continued)

FOREIGN PATENT DOCUMENTS

| CA | 2185701 C | 9/1995 |
| FR | 2109534 A5 | 5/1972 |

(Continued)

OTHER PUBLICATIONS

International Search Report in related PCT Application No. PCT/NL2010/050687, mailed Jul. 11, 2011.
(Continued)

*Primary Examiner* — Monica Huson
(74) *Attorney, Agent, or Firm* — Troutman Sanders LLP; Ryan A. Schneider; Christopher C. Close, Jr.

(57) ABSTRACT

The production of a biaxially oriented tube from thermoplastic material, wherein a tube in preform condition is extruded from thermoplastic material using an extruder having an extruder die head with an inner die member that forms a lumen in the tube in preform condition. The tube in preform condition is subjected to a temperature conditioning. Use is made of a expansion device comprising a non-deformable expansion part having a gradually increasing diameter to a maximum diameter, which expansion part is contacted by the tube and exerts an expanding force so as to bring about expansion of the tempered tube in circumferential direction. The method comprises drawing the tempered tube over the expansion device using a drawing device, in such a manner that said tube is transformed from a tube in preform condition into a biaxially oriented tube
(Continued)

with thermoplastic material which is oriented in axial direction and in circumferential direction of the tube.

22 Claims, 10 Drawing Sheets

(51) Int. Cl.
| | |
|---|---|
| *B29C 55/26* | (2006.01) |
| *B29C 47/88* | (2006.01) |
| *B29C 47/34* | (2006.01) |
| *B29C 47/90* | (2006.01) |
| *B29K 27/06* | (2006.01) |
| *B29L 23/00* | (2006.01) |
| *B29K 101/12* | (2006.01) |

(52) U.S. Cl.
CPC ........ *B29C 47/8805* (2013.01); *B29C 47/908* (2013.01); *B29C 55/26* (2013.01); *B29C 47/0038* (2013.01); *B29C 47/0057* (2013.01); *B29C 47/34* (2013.01); *B29C 47/884* (2013.01); *B29C 47/8835* (2013.01); *B29C 47/902* (2013.01); *B29C 47/903* (2013.01); *B29C 2947/92209* (2013.01); *B29C 2947/92428* (2013.01); *B29K 2027/06* (2013.01); *B29K 2101/12* (2013.01); *B29K 2995/0053* (2013.01); *B29L 2023/22* (2013.01)

(56) References Cited

U.S. PATENT DOCUMENTS

| | | |
|---|---|---|
| 5,650,114 A | 7/1997 | Ward et al. |
| 5,817,270 A | 10/1998 | Prenger |
| 6,214,283 B1 | 4/2001 | Visscher et al. |
| 2005/0062182 A1 | 3/2005 | Van Lenthe et al. |
| 2007/0164486 A1 | 7/2007 | Van Lenthe et al. |

FOREIGN PATENT DOCUMENTS

| | | |
|---|---|---|
| GB | 2080191 A | 2/1982 |
| WO | 9002644 A1 | 3/1990 |
| WO | 9701428 A1 | 1/1997 |
| WO | 9706940 A1 | 2/1997 |
| WO | 0053392 A1 | 9/2000 |

OTHER PUBLICATIONS

Search Report in related NL Application No. NL2007592, mailed May 12, 2014.

INSTALLATIONS FOR MANUFACTURING BIAXIALLY ORIENTED TUBING AND THE TUBING ITSELF

CROSS-REFERENCE TO RELATED APPLICATIONS

This application is a divisional of U.S. Ser. No. 13/502,720, filed 20 Jun. 2012, which application is a US National Stage of International Application No. PCT/NL2010/050687, filed 18 Oct. 2010, which claims the benefit of NL 2003666, filed 19 Oct. 2009, each herein fully incorporated by reference.

BACKGROUND OF THE INVENTION

1. Field of the Invention

The present invention relates to methods and devices for manufacturing biaxially oriented tubing of thermoplastic material.

2. Description of the Related Art

When producing biaxially oriented tubing of thermoplastic material, e.g., pipes of polyvinylchloride, it has proven to be difficult to produce tubing with uniform final dimensions. Such uniformity is desirable, e.g., as biaxially oriented tubing elements, e.g., pressure pipes, e.g., for transportation of water, are interconnected end-to-end, e.g., via socket connections.

In EP 823 873 a method is disclosed for the production of biaxially oriented tubing. Use is made of a rigid mandrel having an expansion part as well as a run-on part upstream of and integral with the expansion part. Spaced upstream from the nose end of the run-on part a closure member is held on the anchoring rod, so as to define a chamber in the lumen of the tube in preform condition. A liquid, e.g., heated water, is fed under pressure between the tube and the mandrel device via one or more ducts that are formed in the mandrel and have a port in the outer surface of the mandrel. This liquid then flows counter to the direction of movement of the tube towards the chamber upstream of the nose end of the expansion device and is then discharged via one or more discharge ducts in the anchoring rod.

In EP 823 873 it is also proposed to provide the mandrel with a run-off part downstream of the expansion part. A film of cold liquid is created between the tube and this run-off part, as one or more feed and discharge ducts for the cold liquid are formed in the mandrel. In particular it is proposed to cause the cold liquid in the film to flow opposite to the motion of the tube, so from a downstream feed opening in the outer surface of the run-off part towards an upstream discharge opening in the outer surface of the run-off part.

In EP 823 873 the tube is made to sealingly engage the mandrel at or near the transition between the expansion part and the run-off part in order to avoid that the cold liquid reaches the expansion part.

In EP 1 159 122 a method is disclosed for the production of biaxially oriented tubing. Use is made of a rigid mandrel having an expansion part as well as a run-on part upstream of and integral with the expansion part. The run-on part has a uniform diameter over its length. A film of liquid is formed between the expansion part and the tube. The liquid is supplied at the downstream end of the expansion part and flows counter to the motion of the tube to one or more outlets arranged in the run-on part of the expansion device. The tube in preform condition is shown to sealingly engage on the nose end of the run-on part as the inner diameter of the preform is less than the diameter of the run-on part.

Thus, a need exists for establishing production processes and production installations that allow producing biaxially oriented tubing of thermoplastic material, the oriented tubing having a desired uniformity of the final dimensions of the oriented tubing as well as good strength properties.

BRIEF SUMMARY OF THE INVENTION

The present invention relates in general to the issue of establishing production processes and production installations that allow to produce biaxially oriented tubing of thermoplastic material, the oriented tubing having a desired uniformity of the final dimensions of the oriented tubing as well as good strength properties, e.g., as the production of rigid pipes, e.g., pressure pipes for transportation of water or gas is envisaged.

In an exemplary embodiment of the present invention, an installation for producing a biaxially oriented tube from thermoplastic material comprises an extruder with an extruder die head having an inner die member adapted to extrude a tube in preform condition from a thermoplastic material, the inner die member forming a lumen in the tube, one or more tempering devices for temperature conditioning the perform, so that a tempered tube in preform condition is obtained having an orientation temperature suitable for the thermoplastic material, and an expansion device downstream of the extruder, the expansion device comprising a non-deformable expansion part having an increasing diameter to a maximum diameter at a downstream end of the expansion part, the expansion part being contacted by the tube and exerting an expanding force on the tube to expand the tempered tube in a circumferential direction, a run-on part located upstream of the expansion part, the run-on part having an upstream nose end, one or more fluid supply ducts having a port in the outer surface of the run-on part or the expansion part, so that a fluid volume is formable between the expansion device and the tube, a drawing device downstream of the expansion device and adapted to act on the tube to transform the tube from a tube in preform condition into a biaxially oriented tube with thermoplastic material oriented in an axial direction and in a circumferential direction of the tube, and a cooling device adapted to cool the biaxially oriented tube, wherein the run-on part is provided with a sealing member that is adapted to be sealingly engaged by the tube in preform condition, the sealing member being arranged upstream of the expansion part of the expansion device and having a diameter that is greater than the run-on part downstream of the sealing member, the sealing member forming an effective seal that prevents the fluid volume from reaching the lumen of the tube in preform condition upstream of the sealing member, and the sealing member being arranged at the nose-end of the run-on part, and wherein the installation is absent an external part at the height of the sealing member that presses the tube in preform condition onto the sealing member.

The installation can further comprise one or more external heat exchange devices that are adapted to influence the temperature of the tube in preform condition and thereby the sealing engagement between the tube and the sealing member of the run-on part of the expansion device.

The installation can further comprise a first heat exchange device arranged upstream of the sealing member of the run-on part, the first heat exchange device is being adapted for controlled external heat exchange with the tube in preform condition, a second heat exchange device arranged downstream of the sealing member, the second heat exchange device being adapted for controlled external heat exchange with the tube in preform condition, and a control device for independent control of the first and second heat exchange devices.

The expansion device can further comprise one or more gas discharge ducts having one or more inlet ports in the exterior surface of the expansion part of the expansion device, an inlet port being open or closed dependent on whether or not the inlet port is covered by the tube, the gas discharge ducts being adapted to relieve gas pressure from the fluid volume when the one or more corresponding inlet ports are open, thereby reducing the expansion of the tube caused by internal gas pressure, the relief of gas pressure continuing until the one or more corresponding inlet ports are covered by the tube.

The expansion device can further comprise a plurality of inlet ports, each associated with a corresponding discharge duct, at differing diameter positions in the exterior surface of the expansion part, the differing diameter positions having different radial distances from a central longitudinal axis of the expansion part, wherein one or more operable valves are associated with the discharge ducts, wherein a selected inlet port and associated discharge duct are adapted to relieve gas pressure when the tube does not cover the inlet port, and one or more non-selected inlet ports and associated discharge ducts are made ineffective, thereby allowing for control over the internal diameter of the tube as it expands by the internal gas pressure in the fluid volume before reaching the non-deformable expansion part.

In another exemplary embodiment, an installation for producing a biaxially oriented tube from thermoplastic material comprises an extruder with an extruder die head having an inner die member adapted to extrude a tube in preform condition from thermoplastic material, the inner die member being adapted to form a lumen in the tube, one or more tempering devices downstream of the extruder and adapted for temperature conditioning the tube in preform condition, an expansion device downstream of the one or more tempering devices, the expansion device comprising a non-deformable expansion part having a central longitudinal axis and an exterior surface with an increasing diameter to a maximum diameter at a downstream end thereof, which exterior surface is adapted to be contacted by the tube and to exert an expanding force on the tube so as to bring about an expansion of the tube in circumferential direction, a run-on part located upstream of the expansion part, the run-on part having an upstream nose end, the nose end being provided with a sealing member adapted to seal the lumen of the tube in preform condition, and a gas supply duct, the gas supply duct having a port in an exterior surface of the run-on part or the expansion part, a gas supply device adapted to supply pressurized gas to the gas supply duct in order to supply pressurized gas to a first gas volume between the expansion device and the tube, the first gas volume being sealed by the sealing member and by the tube contacting the exterior surface of the expansion part, the pressurized gas therein effecting a first gradual expansion of the tube, a drawing device arranged downstream of the expansion device and is adapted to act on the tube and exert a tensile force on the tube, wherein the expansion device is further provided with multiple gas discharge ducts, each gas discharge duct having an inlet port in the exterior surface of the expansion part, wherein the length of each gas discharge duct comprises a portion defined within the expansion part by the distance from the central longitudinal axis of the expansion part to the exterior surface of the expansion part, the length of each gas discharge duct within the expansion part being thus dependent on the location of the inlet port, as the expansion part has an increasing diameter to a maximum diameter at the downstream end thereof, and wherein the installation comprises one or more valves associated with the multiple gas discharge ducts and adapted to selectively open and close a gas discharge duct in order to relief gas from the first gas volume via an opened gas discharge duct and thereby provide internal diameter control of the gradually expanding tube.

The expansion device cam comprise a non-deformable run-off part adjoining the downstream end of the expansion part, wherein the run-off part has a reduced diameter section and a non-deformable increased diameter portion delimiting a downstream end of the reduced diameter section, the increased diameter portion having a greater diameter than the reduced diameter section and greater than the maximum diameter of the expansion part, the increased diameter portion being adapted to sealingly engage the tube, and wherein the expansion device is further provided with one or more gas supply ducts having one or more ports in an exterior surface of the reduced diameter section and connected to the gas supply device in order to supply pressurized gas to a second gas volume between the reduced diameter section of the run-off part of the expansion device and the tube, the second gas volume being sealed by the tube contacting the expansion part and by the tube contacting the non-deformable increased diameter portion, the pressurized gas therein effecting a second gradual expansion of the tube.

The expansion device can comprise a valve controlled passage in communication with the first gas volume and the second gas volume, the passage comprising a valve.

The installation can comprise at least one outer diameter ring member that is arranged around and radially spaced from the reduced diameter section, the at least one outer diameter ring member having a length smaller than the reduced diameter section and being arranged such that the tube passes through the outer diameter ring member, wherein the at least one outer ring member is adapted to exert a constrictive force on the tube as the tube passes through the at least one outer ring member with the second gas volume avoiding seizing of the tube onto the reduced diameter section.

The installation can comprise a displacement device adapted for axial displacement of the at least one outer diameter ring member in order to allow displacement thereof in axial direction relative to the run-off part.

The installation can comprise two outer diameter ring members, which are each arranged around and radially spaced from the reduced diameter section, and wherein the outer ring members are spaced from one another in axial direction, each outer diameter ring member having a length smaller than the reduced diameter section and being arranged such that the tube passes through the outer diameter ring member, wherein each outer ring member is adapted to exert a constrictive force on the tube as the tube passes through the at least one outer ring member with the second gas volume avoiding seizing of the tube onto the reduced diameter section.

The installation can comprise two outer diameter ring members, which are each arranged around and radially spaced from the reduced diameter section, and wherein the outer ring members are spaced from one another in axial direction, each outer diameter ring member having a length smaller than the reduced diameter section and being arranged such that the tube passes through the outer diameter ring member, wherein each outer ring member is adapted to exert a constrictive force on the tube as the tube passes through the at least one outer ring member with the second gas volume avoiding seizing of the tube onto the reduced diameter section, and wherein the installation comprises an external cooling device comprising one or more cooling liquid spray nozzles adapted to spray cooling liquid onto the tube between the two outer diameter ring members.

The installation can comprise a displacement device adapted for axial displacement of each of the two outer diameter ring members in order to adjust the cooling of the tube by the external cooling device.

At least one outer diameter ring member can be composed of two semi-circular parts allowing placing the ring member around the tube.

At least one outer diameter ring member can comprises an internal cooling fluid duct in order to cool the ring member.

In another exemplary embodiment, an installation for producing a biaxially oriented tube from thermoplastic material comprises an extruder with an extruder die head having an inner die member adapted to extrude a tube in preform condition from thermoplastic material, the inner die member being adapted to form a lumen in the tube, one or more tempering devices downstream of the extruder and adapted for temperature conditioning the tube in preform condition, an expansion device downstream of the one or more tempering devices, the expansion device comprising a non-deformable expansion part having a central longitudinal axis and an exterior surface with an increasing diameter to a maximum diameter at a downstream end thereof, which exterior surface is adapted to be contacted by the tube and to exert an expanding force on the tube so as to bring about an expansion of the tube in circumferential direction, a run-on part located upstream of the expansion part, the run-on part having an upstream nose end, the nose end being provided with a sealing member adapted to seal the lumen of the tube in preform condition, and a non-deformable run-off part adjoining the downstream end of the expansion part, wherein the run-off part has a reduced diameter section and a non-deformable increased diameter portion delimiting a downstream end of the reduced diameter section, the increased diameter portion having a greater diameter than the reduced diameter section and greater than the maximum diameter of the expansion part, the increased diameter portion being adapted to sealingly engage the tube, a gas supply duct, the gas supply duct having a port in an exterior surface of the run-on part or the expansion part, a gas supply device adapted to supply pressurized gas to the gas supply duct in order to supply pressurized gas to a first gas volume between the expansion device and the tube, the first gas volume being sealed by the sealing member and by the tube contacting the exterior surface of the expansion part, the pressurized gas therein effecting a first gradual expansion of the tube, and a drawing device arranged downstream of the expansion device and is adapted to act on the tube and exert a tensile force on the tube, wherein the expansion device is further provided with a gas supply duct having one or more ports in an exterior surface of the reduced diameter section and connected to the gas supply device in order to supply pressurized gas to a second gas volume between the reduced diameter section of the run-off part of the expansion device and the tube, the second gas volume being sealed by the tube contacting the expansion part and by the tube contacting the non-deformable increased diameter portion, the pressurized gas therein effecting a second gradual expansion of the tube.

The installation can comprise at least one outer diameter ring member that is arranged around and radially spaced from the reduced diameter section, the at least one outer diameter ring member having a length smaller than the reduced diameter section and being arranged such that the tube passes through the outer diameter ring member, wherein the at least one outer ring member is adapted to exert a constrictive force on the tube as the tube passes through the at least one outer ring member with the second gas volume avoiding seizing of the tube onto the reduced diameter section.

The installation can comprise a displacement device adapted for axial displacement of the at least one outer diameter ring member in order to allow displacement thereof in axial direction relative to the run-off part.

The installation can comprise two outer diameter ring members, which are each arranged around and radially spaced from the reduced diameter section, and wherein the outer ring members are spaced from one another in axial direction, each outer diameter ring member having a length smaller than the reduced diameter section and being arranged such that the tube passes through the outer diameter ring member, wherein each outer ring member is adapted to exert a constrictive force on the tube as the tube passes through the at least one outer ring member with the second gas volume avoiding seizing of the tube onto the reduced diameter section.

The installation can comprise two outer diameter ring members, which are each arranged around and radially spaced from the reduced diameter section, and wherein the outer ring members are spaced from one another in axial direction, each outer diameter ring member having a length smaller than the reduced diameter section and being arranged such that the tube passes through the outer diameter ring member, wherein each outer ring member is adapted to exert a constrictive force on the tube as the tube passes through the at least one outer ring member with the second gas volume avoiding seizing of the tube onto the reduced diameter section, and wherein the installation comprises an external cooling device comprising one or more cooling liquid spray nozzles adapted to spray cooling liquid onto the tube between the two outer diameter ring members.

In another exemplary embodiment, an installation for producing a biaxially oriented tube from thermoplastic material comprises an extruder with an extruder die head having an inner die member adapted to extrude a tube in preform condition from thermoplastic material, the inner die member being adapted to form a lumen in the tube, one or more tempering devices downstream of the extruder and adapted for temperature conditioning the tube in preform condition, an expansion device downstream of the one or more tempering devices, the expansion device comprising a non-deformable expansion part having a central longitudinal axis and an exterior surface with an increasing diameter to a maximum diameter at a downstream end thereof, which exterior surface is adapted to be contacted by the tube and to exert an expanding force on the tube so as to bring about an expansion of the tube in circumferential direction, a run-on part located upstream of the expansion part, the run-on part having an upstream nose end, the nose end being provided with a sealing member adapted to seal the lumen of the tube in preform condition, and a non-deformable run-off part adjoining the downstream end of the expansion part, wherein the run-off part has a reduced diameter and a non-deformable increased diameter portion delimiting a downstream end of the reduced diameter section, the increased diameter portion having a greater diameter than the reduced diameter, the increased diameter portion being adapted to sealingly engage the tube, a gas supply duct, the gas supply duct having a port in an exterior surface of the run-on part or the expansion part, a gas supply device adapted to supply pressurized gas to the gas supply duct in order to supply pressurized gas to a first gas volume between the expansion device and the tube, the first gas volume being sealed by the sealing member and by the tube contacting the exterior surface of the expansion part, the pressurized gas therein effecting a first gradual expansion of the tube, and a drawing device arranged downstream of the expansion device and is adapted to act on the tube and exert a tensile force on the tube, wherein the expansion device is further provided with a gas supply duct having one or more ports in an exterior surface of the reduced diameter section and connected to the gas supply device in order to supply pressurized gas to a second gas volume between the reduced diameter section of the run-off part of the expansion device and the tube, the second gas volume being sealed by the tube contacting the expansion part and by the tube contacting the non-deformable increased diameter portion, and wherein the installation comprises at least one outer diameter ring member that is arranged around and radially spaced from the reduced diameter section, the at least one outer diameter ring member having a length smaller than the reduced diameter section and being arranged such that the tube passes through the outer diameter ring member, wherein the at least one outer ring member is adapted to exert a constrictive force on the tube as the tube passes through the at least one outer ring member with the second gas volume avoiding seizing of the tube onto the reduced diameter section, wherein the at least one outer ring member is arranged upstream of and adjacent the non-deformable increased diameter portion in order to enhance sealing contact between the tube and the non-deformable increased diameter portion.

In another exemplary embodiment, an installation for producing a biaxially oriented tube from thermoplastic material comprises an extruder with an extruder die head having an inner die member adapted to extrude a tube in preform condition from thermoplastic material, the inner die member being adapted to form a lumen in the tube, one or more tempering devices downstream of the extruder and adapted for temperature conditioning the tube in preform condition, an expansion device downstream of the one or more tempering devices, the expansion device comprising a non-deformable expansion part having a central longitudinal axis and an exterior surface with an increasing diameter to a maximum diameter at a downstream end thereof, which exterior surface is adapted to be contacted by the tube and to exert an expanding force on the tube so as to bring about an expansion of the tube in circumferential direction, a run-on part located upstream of the expansion part, the run-on part having an upstream nose end, the nose end being provided with a sealing member adapted to seal the lumen of the tube in preform condition, a non-deformable run-off part adjoining the downstream end of the expansion part, wherein the run-off part has a reduced diameter section and a non-deformable increased diameter portion delimiting a downstream end of the reduced diameter section, the increased diameter portion having a greater diameter than the reduced diameter, the increased diameter portion being adapted to sealingly engage the tube, and a gas supply duct, the gas supply duct having a port in an exterior surface of the run-on part or the expansion part, a gas supply device adapted to supply pressurized gas to the gas supply duct in order to supply pressurized gas to a first gas volume between the expansion device and the tube, the first gas volume being sealed by the sealing member and by the tube contacting the exterior surface of the expansion part, the pressurized gas therein effecting a first gradual expansion of the tube, and a drawing device arranged downstream of the expansion device and is adapted to act on the tube and exert a tensile force on the tube, wherein the expansion device is further provided with a gas supply duct having one or more ports in an exterior surface of the reduced diameter section and connected to the gas supply device in order to supply pressurized gas to a second gas volume between the reduced diameter section of the run-off part of the expansion device and the tube, the second gas volume being sealed by the tube contacting the expansion part and by the tube contacting the non-deformable increased diameter portion, and wherein the installation comprises at least one outer diameter ring member that is arranged around and radially spaced from the reduced diameter section, the at least one outer diameter ring member having a length smaller than the reduced diameter section and being arranged such that the tube passes through the outer diameter ring member, wherein the at least one outer ring member is adapted to exert a constrictive force on the tube as the tube passes through the at least one outer ring member with the second gas volume avoiding seizing of the tube onto the reduced diameter section, wherein the at least one outer ring member is arranged adjacent the downstream end of the non-deformable expansion part in order to enhance sealing contact between the tube and the expansion device in a region thereof where the run-off part adjoins the expansion part.

Another aspect of the invention relates to a method for producing a biaxially oriented tube from thermoplastic material, wherein a tube in preform condition is extruded from thermoplastic material using an extruder which is provided with an extruder die head having an inner die member, the inner die member forming a lumen in the tube in preform condition, wherein the tube in preform condition is subjected to a temperature conditioning, so that a tempered tube in preform condition is obtained having an orientation temperature which is suitable for the thermoplastic material, and wherein use is made of an expansion device, the expansion device comprising a non-deformable expansion part having a gradually increasing diameter to a maximum diameter at a downstream end thereof, which expansion part is contacted by the tube and exerts an expanding force on the tube so as to bring about an expansion of the tempered tube in preform condition in circumferential direction, a run-on part which is located upstream of the expansion part, the run-on part having an upstream nose end.

The method comprises drawing the tempered tube over the expansion device using a drawing device which is arranged downstream of the expansion device and acts on the tube, in such a manner that the tube is transformed from a tube in preform condition into a biaxially oriented tube with thermoplastic material which is oriented in axial direction and in circumferential direction of the tube. The biaxially oriented tube is cooled.

In this method of one aspect of the invention use is made of an expansion device having one or more fluid supply ducts. The one or more fluid supply ducts have a port in the outer surface of the run-on part and/or the expansion part of the expansion device, and a fluid is introduced between the expansion device and the tube.

One aspect of the invention aims to provide measures that allow for improvements over the prior art or at least provide for a useful alternative.

It is a further object of one aspect of the invention to provide for measures that allow for a suitable internal tempering of the tube in preform condition, possibly using liquid circulated within the lumen, e.g., in combination with heating and/or cooling on the outside of the tube in preform condition.

It is a further object of one aspect of the invention to provide measures that allow for a suitable internal tempering of the tube in preform condition, possibly using liquid circulated within the lumen, as well as introducing a fluid, e.g., a liquid or a gas, between the expansion device, e.g., the expansion part thereof, and the tube, the introduction of fluid and the internal tempering being independent from one another.

It is a further object of one aspect of the invention to provide a method that allows for enhanced uniformity of the tubing, in particular with respect to wall thickness and cross-sectional shape both in circumferential direction and over the length of the tube.

It is a further object of one aspect of the invention to provide a method wherein no cold liquid is conveyed through the anchoring rod to the expansion device.

It is a further object of one aspect of the invention to provide a method that allows for an easy and reliable start-up procedure.

It is a further object of one aspect of the invention to provide a method that allows for an increased maximum diameter of the expansion part as well as significant orientation in circumferential direction of the tube. This allows the production of large diameter biaxially oriented tubes without undue traction forces having to be applied to the tube and without a problematic start-up procedure.

In order to achieve one or more of the above objects one aspect of the invention provides a method, wherein use is made of a expansion device with a run-on part that is provided with a sealing member that is sealingly engaged by the tube in preform condition, the sealing member being arranged at a distance upstream of the expansion part of the expansion device and having a diameter that is greater than the run-on part downstream of the sealing member, the sealing member forming an effective seal that prevents the fluid from reaching the lumen of the tube in preform condition upstream of the sealing member.

Preferably the sealing member is arranged at the nose-end of the run-on part.

The sealing member can be seen as a thickened portion of the run-on part compared to the portion of the run-on part downstream of the sealing member.

One aspect of the invention allows the use of a run-on part of a significant length, thereby enhancing the internal support of the tube in preform condition by the run-on part upstream of the expansion part. This contributes to enhanced uniformity of the biaxially stretching of the tube in preform condition. Also this arrangement allows for a reliable and stable fluid volume, e.g., as a film, between the run-on part and the tube in preform condition. The sealing engagement of the sealing member with the tube in preform condition provides a reliable barrier between the zone upstream of the sealing member and the zone downstream of the sealing member within the lumen of the preform, so that conditions and/or actions can be performed in one of the zones that are fully or at least largely independent from the other zone.

In a possible embodiment of one aspect of the invention the fluid in the fluid volume between run-on part and/or expansion part of the expansion device and the tube forms a film of fluid, primarily acting as a lubricant between the tube and the expansion device, the fluid in the film preferably being a liquid, e.g., water, preferably heated.

In comparison with the prior art method of EP 823 873 one aspect of the invention allows to provide for a stable lubrication film between the expansion device, preferably both the run-on part and the expansion part, and the tube in preform condition. In comparison with the prior art method of EP 1 159 122 one aspect of the invention allows to provide a longer run-on part with a stable film between the run-on part and the tube in preform condition.

The fluid may in a practical embodiment a liquid. In a practically preferred embodiment water is used, more preferably non-boiling heated water, wherein a water heater and pump are used to provide and supply the heated water at a suitable pressure to the expansion device, e.g., at a temperature of approximately 100° C. The pressure is chosen so as to allow the formation of a liquid film between the expansion device and the tube.

In another embodiment, as will also be discussed in combination with another aspect of the invention, the fluid is a gas, e.g., air, supplied via a compressor or other pressurized gas source to the one or more supply ducts in the expansion device. The use of a gas, e.g., air, has some advantages over the use of a liquid, e.g., that any problems associated with liquid that is entrained with the tube to beyond the expansion device are avoided.

One aspect of the invention also relates to embodiments wherein the fluid in the fluid volume between the expansion device and the tube is used to cause gradual expansion of the tube due to internal fluid pressure before the tube comes into contact with the expansion part. In these embodiments the fluid preferably is a gas, e.g., air.

The use of a gas, e.g., air, as fluid allows to perform the production method such that a pressurized gas volume is entrapped between the tube on the one hand and the run-on part and the expansion part of the expansion device on the other hand, the tube in preform condition sealingly engaging the sealing member on the run-on part as well as sealingly engaging at least a downstream portion of the expansion part, e.g., near or at the transition to the run-off part of the expansion device. The pressure of the entrapped gas volume then causes internal fluid pressure on the tube and so gradual expansion of the tube already before the tube actually contacts the expansion part. The passage over at least the downstream portion of the expansion part of the expansion device then governs a further, possibly final, stage of the circumferential orientation of the thermoplastic material. Clearly the volume of gas causes no frictional resistance to the movement of the tube, which may be advantageous. It will be appreciated that this approach can also be done in combination with the use of gas as a fluid as will be explained with reference to another aspect of the invention, or with other aspects of the invention.

In an exemplary embodiment a gas, e.g., air, is supplied to the fluid volume. This fluid volume is then bounded at one axial end by the sealing contact between the tube in preform condition and the sealing member and at the other axial end by the sealing engagement between the tube and at least a downstream portion of the expansion part, e.g., near or at the transition to the run-off part. As is preferred the pressure of the gas in the fluid volume is then used to cause gradual expansion of the tube by internal gas pressure already before the tube actually contacts the non-deformable expansion part during production of biaxially oriented tube.

The presence of the sealing member and its sealing effect allow for a significant and stable gas pressure in the fluid volume and thereby for effective use of gradual expansion by internal gas pressure of the tube prior to contact with the expansion part. The tube, having undergone some expansion, e.g., a selected degree of expansion as will be explained below, then contacts the expansion part and is then subjected to expansion under the influence of the non-deformable expansion part.

The start-up of the production installation and method according to one aspect—and possibly also one or more other aspects—of the invention is also greatly facilitated by the presence of the sealing member, its sealing effect, and the possibility to supply gas under pressure between the run-on part and the tube downstream of the sealing member. During start-up the tube in preform condition is made to pass over the sealing member and then to come into contact with the expansion part. Gas is then supplied in this region between the run-on part and the tube, so that the tube expands under the internal gas pressure. As is preferred in this start-up procedure, the tube—in the region between the sealing member and the maximum diameter of the expansion part, is made to expand locally to a large diameter that is at least as great as the maximum diameter of the expansion part so that upon continued progress of the expanded portion of the tube in downstream direction, the portion of large diameter passes easily over the maximum diameter portion of the expansion device. Once the passing of the tube over the expansion device has stabilized in this start-up procedure, the gas pressure in this volume can be relieved so that—during normal production of biaxially oriented tube—a reduced expansion is affected by the gas pressure and the remainder of the expansion is affected by contact with the expansion part.

The pressure of the gas in the gas volume could be controlled by means of a pressure control valve in the supply means for the gas.

It is preferred to have—in addition to the one or more supply ducts—one or more gas discharge ducts that are formed in the expansion device, the one or more discharge ducts having one or more inlet ports in the exterior surface of the expansion part of the expansion device, an inlet port being open or closed or partly closed dependent on whether or not the inlet port is covered and closed by the tube or to which portion of the inlet port is closed by the tube. A gas discharge duct then provides for the relief of gas pressure from the fluid volume when the one or more corresponding inlet ports are at least partly open, and thus establishes a control of the expansion of the tube that is caused by internal gas pressure. In this embodiment the tube itself basically acts as valve in combination with a simple inlet port or inlet ports (e.g., distributed in circumferential direction) and allows dispensing with a complicated gas pressure control valve arrangement. This embodiment also allows for a fail-safe operation of the installation as the gas pressure in the fluid volume can never become excessive. A simple open-close valve may be provided for the discharge duct, e.g., to close a discharge duct during start-up of the method as increased expansion of the tube by internal gas pressure may then be used advantageously as explained above.

In a further preferred embodiment multiple inlet ports, each associated with a corresponding discharge duct, are provided at differing diameter positions in the exterior surface of the expansion part, the differing diameter positions having different radial distances from the central longitudinal axis of the expansion part. One or more operable valves, e.g., open-close valves, are associated with the discharge ducts, so that a selected inlet port and associated discharge duct can be made effective to allow for relief of gas pressure when the tube does not fully cover and close the inlet port. At the same time the other non-selected inlet ports and associated discharge ducts are then made ineffective by closing the associated valve or valves. This embodiment allows controlling the internal diameter of the tube as it is effectively expanded by the internal gas pressure in the fluid volume and reaches the expansion part of the expansion device. This allows for a simple selection of the degree of expansion to be obtained via the internal gas pressure versus the remaining expansion via contact with the expansion part.

In an advantageous embodiment of the method of one aspect of the invention use is made of one or more external heat exchange devices that are adapted and operated to influence the temperature of the tube in preform condition, wherein the external heat exchange devices are used to influence the sealing engagement between the tube in preform condition and the sealing member of the run-on part of the expansion device. In a practical embodiment a first heating device is used that is adapted for controlled external heating of the tube in preform condition, and a second heating device is used that is adapted for controlled external heating of the tube in preform condition, wherein the first and second heating device are independently controlled, and wherein the first heating device is arranged upstream of the sealing member of the run-on part, and wherein the second heating device is arranged downstream of the sealing member. This embodiment allows using the first heating device for controlling the sealing engagement with the sealing member, and the second heating device in order to influence the tube directly upstream of and/or during the passage of the tube over the expansion part of the expansion device. One or more of these heating devices may include multiple heating elements distributed around the path of the tube, e.g., multiple infrared heating elements.

In a possible embodiment of the method—for temperature conditioning of the tube in preform condition—a liquid circulation compartment is formed in the lumen of the tube between a closing member that is arranged at a distance upstream from the nose end of the run-on part on the one hand and the sealing member on the other hand, wherein a liquid is circulated through the liquid circulation compartment. This method allows establishing an effective internal temperature conditioning of the tube in preform condition directly upstream of the expansion device. In practice the internal temperature condition may be affected with hot water, e.g., close to the orientation temperature, e.g., close to the boiling temperature of water. The closing member is located such that a suitable length of the liquid circulation compartment is obtained. The closing member may be arranged at the die head or close to the die head, e.g., as shown in WO95/25626, FIG. 3. In another arrangement the closing member is arranged between the die head and the expansion device, or it can be envisaged to employ multiple liquid circulation compartments between the die head and the expansion device by means of multiple closing members and associated liquid circulation ducts.

When the method of one aspect of the invention is performed such that an upstream tempering from within the tube in preform condition is performed or enhanced by an internal liquid circulation compartment upstream of the expansion device, and such that a fluid volume is established between the expansion device and the tube by fluid that is supplied via one or more fluid supply ducts in the expansion device, then the sealing member and the sealing engagement thereof with the preform act to prevent a loss or instability of the pressure in the fluid volume—which pressure will be preferably a higher pressure than the pressure of the liquid in the internal liquid circulation compartment.

In an embodiment the sealing member is an annular sealing member fitted on the run-on part of the expansion device, the sealing member including a conical run-on surface for the tube, gradually increasing in diameter in downstream direction.

The sealing member preferably is a non-deformable member, e.g., a metallic member. Preferably there is no provision to supply a lubricant directly to the outer surface of the sealing member. In more complex embodiments however the sealing member may be adapted to control the frictional engagement thereof with the tube in preform condition, e.g., provided with an integral and dedicated lubrication device, e.g., allowing a gas, e.g., air, to be fed directly between the sealing portion and the preform. In another embodiment the sealing member may be construed to have a variable diameter with an associated control means, e.g., with an outer metallic skin, e.g., expandable under hydraulic or pneumatic pressure, so as to control the sealing engagement with the tube in preform condition.

In a possible embodiment a force monitoring device is associated with the sealing member, adapted to monitor the axial force on the sealing member, e.g., including one or more electronic force sensors, e.g., strain gauges. The monitoring device may be coupled to, when present, one or more external heat exchange devices that are used to influence the sealing engagement of the tube in preform condition with the sealing member.

In a possible embodiment one or more temperature sensors are provided on the expansion device, preferably at or near the sealing member, most preferably at the sealing member and in direct contact with the inner face of the tube, preferably allowing to measure the temperature of the preform in the region, e.g., the one or more sensors being coupled to the first and/or second external heat exchange devices that are used to influence the sealing engagement of the preform with the sealing member in order to assist in suitable operation thereof. The one or more temperature sensors sense the temperature of the inner face of the preform. The intimate contact between the tube in preform condition and the sealing member is beneficial for the reliability and accuracy of the temperature sensing when the one of more sensors are integrated in the sealing member.

In combination with one or more temperature sensors (e.g., multiple at circumferentially spaced apart positions) that sense the temperature of the outer face of the preform an indication is obtainable of the temperature profile within the wall of the preform, e.g., in order to set and/or to maintain a desired temperature profile within the wall. This may well be advantageous for achieving the desired biaxial orientation of the plastic material; as such result depends also on the actual temperature of the plastic material within the wall when subjected to orientating stresses in the process. For example the one or more temperature sensors on the inside of the tube in preform condition may be linked to an output control of the extruder and/or a control of a cooling device that cools the extruded tube in preform condition (e.g., an internal cooling device) in order to influence the temperature profile in the tube wall. It is preferred for the one of more temperature sensors for the inner face of the tube to be integrated in the sealing member, or to be located upstream thereof on the anchoring rod, e.g., within a distance of at most 2 meters from the sealing member. It may be envisaged to have multiple temperature sensors for the inner face of the preform, each sensing the temperature of a sector of the inner face when seen in circumferential direction of the inner face. Preferably the one or more temperature sensors for the inner face of the preform are in direct contact with the inner face. The one or more sensors that sense the inner face temperature may be wired to one or more associated control units or may be of the wireless communication type.

In a possible embodiment the anchoring rod may be embodied as a chain or a cable.

Possibly one or more fluid supply conduits are embodied as hose or tubes, e.g., connected to the chain or cable at intervals.

In a possible embodiment the expansion part has a first conical surface increasing in diameter in downstream direction, adjoined at its downstream end by a cylindrical surface of a first diameter, adjoined at its downstream end by a second conical expansion surface increasing in diameter in downstream direction, and wherein preferably the diameter of the sealing member on the run-on part is greater than the first diameter of the expansion part.

In an exemplary embodiment use is made of an expansion device having a run-off part downstream of the expansion part, preferably a run-off part according to another aspect of the invention.

In an exemplary embodiment the run-off part has a reduced diameter section having a smaller diameter than the maximum diameter of the expansion part, and use is made of at least one outer diameter ring member that is arranged around the reduced diameter section, wherein the outer diameter ring member is arranged such that the oriented tube passes through the ring member while being in contact with the ring member, the outer diameter ring member and the reduced diameter section being dimensioned such that seizing of the oriented tube between the run-off part and the at least one outer diameter ring member is avoided, preferably the inside of the oriented tube being radially spaced from the reduced diameter section, preferably the expansion device having one or more fluid supply ducts having one or more ports in the reduced diameter section, a gas being supplied between the reduced diameter section and the oriented tube to establish a second fluid volume there between.

As is preferred use is then made of a first external cooling device that is adapted and operated to cool the oriented tube externally while passing over the run-off part.

It is envisaged that the outer diameter ring member, or the upstream outer diameter ring member if use is made of two spaced apart ring members, could be employed to contribute to the sealing engagement of the tube with the expansion device in the region of the transition from the expansion part to the run-off part, e.g., to maintain a reliable sealing contact in the region. The outer ring member could be construed to exert a constrictive force on the tube to obtain or improve this effect.

The inventors envisage that a gradual expansion of the tube by internal gas pressure, in combination with a non-deformable expansion part can be achieved with high reliability and stability during production, as the sealing member arranged at or near the nose end of the expansion device secures a reliable seal of the gas volume at the upstream end thereof and with an outer diameter ring member in combination with a reduced diameter section to assist in securing a highly reliable seal at the downstream end. As indicated above, such measures at the downstream side of the gas volume are also part of another aspect of the invention and will be discussed more in detail there.

One aspect of the invention also relates to a method wherein one or more fluid discharge ducts are formed in the expansion device, which ducts have one or more ports in an exterior surface of the expansion device, e.g., to have a circulation of liquid through the fluid volume during the production.

One aspect of the invention also relates to an expansion device for use in a method and/or installation for producing a biaxially oriented tube, wherein a tempered thermoplastic material tube in preform condition is drawn over the expansion device in such a manner that the tube is transformed from a tube in preform condition into a biaxially oriented tube with thermoplastic material which is oriented in axial direction and in circumferential direction of the tube, which expansion device comprises a non-deformable expansion part having a gradually increasing diameter to a maximum diameter at a downstream end thereof, which expansion part is adapted to be contacted by the tube and to exert an expanding force on the tube so as to bring about an expansion of the tempered tube in preform condition in circumferential direction, a run-on part which is located upstream of the expansion part, the run-on part having an upstream nose end, wherein the expansion device has one or more fluid supply ducts, which one or more fluid supply ducts have a port in the outer surface of the run-on part and/or the expansion part of the expansion device to allow a fluid to be introduced between the expansion device and the tube, and wherein the run-on part is provided with a sealing member that is adapted to be sealingly engaged by the tube in preform condition, the sealing member being arranged at a distance upstream of the expansion part of the expansion device and having a diameter that is greater than the run-on part downstream of the sealing member, the sealing member be adapted to form an effective seal that prevents the fluid from reaching the lumen of the tube in preform condition upstream of the sealing member, preferably the sealing member being arranged at the nose-end of the run-on part.

Another aspect of the invention relates to a method for producing a biaxially oriented tube from thermoplastic material, wherein a tube in preform condition is extruded from thermoplastic material using an extruder which is provided with an extruder die head having an inner die member, the inner die member forming a lumen in the tube in preform condition, wherein the tube in preform condition is subjected to a temperature conditioning by one or more tempering devices so that a tempered tube is obtained having an orientation temperature which is suitable for the thermoplastic material, and wherein use is made of an expansion device in the lumen downstream of the extruder, the expansion device comprising a non-deformable expansion part having a gradually increasing diameter to a maximum diameter at a downstream end thereof, which expansion part is contacted by the tube and exerts an expanding force on the tube so as to bring about expansion of the tempered tube in circumferential direction, a run-off part adjoining the expansion part at the downstream end thereof, wherein the method comprises drawing the tempered tube over the expansion device using a drawing device which is arranged downstream of the expansion device and acts on the tube, in such a manner that the tube is drawn over the expansion device and transformed from a tube in preform condition into a biaxially oriented tube with thermoplastic material being oriented in axial direction and in circumferential direction, wherein the biaxially oriented tube is cooled.

In EP 823 873 a method is disclosed wherein use is made of a rigid expansion device comprising a non-deformable expansion part having an increasing diameter to a maximum diameter at downstream end thereof, which expansion part is contacted by the tube and exerts an expanding force on the preform so as to bring about expansion of the tempered tube in preform condition in circumferential direction. A non-deformable run-off part adjoins the expansion part at the downstream end thereof and generally has a diameter not exceeding the maximum diameter of the expansion part.

In EP 823 873, FIG. 5, the oriented tube is cooled both internally and externally while passing over the run-off part of the expansion device. An outer diameter calibrating ring is arranged spaced a distance downstream from the run-off part of the expansion device. This calibrating ring acts to reduce the diameter of the oriented tube. The calibrating ring is displaceable in axial direction based on control signals obtained via a measuring device that measures the dimensions (diameter, wall thickness, shape) of the oriented tube further downstream.

This particular prior art method of EP 823 873 has shown to produce acceptable results with regard to the final dimensions of the oriented tubing. It is noted that biaxially oriented thermoplastic tubes made according to this method, and according to the inventive methods, are primarily contemplated for pressure applications, e.g., as pressure water transport pipe that delivers water, e.g., potable water, over a long distance. The known tubes are made of polyvinylchloride.

Another aspect of the present invention aims to provide measures that allow for improvements over the prior art or at least to provide a useful alternative.

It is a further object of another aspect of the invention to provide a method that allows for enhanced strength of the oriented tubing.

It is a further object of another aspect of the invention to provide a method that allows for enhanced uniformity of the tubing, in particular with respect to wall thickness and cross-sectional shape.

It is a further object of another aspect of the invention to provide a method wherein no cold liquid, e.g., cooling water, is conveyed to the expansion device.

It is a further object of another aspect of the invention to provide a method wherein friction between the expansion device and the tube is reduced, without the measures taken to do so impairing the quality of the oriented tubing and/or the effectiveness of the production process.

According to another aspect of the present invention one or more of the above objects are achieved by a method wherein the run-off part, which is downstream of the expansion part, has a reduced diameter section having a smaller diameter than the maximum diameter of the expansion part, and wherein use is made of at least one outer diameter ring member that is arranged at the location of the reduced diameter section and around the reduced diameter section, and wherein the oriented tube passes through the outer diameter ring member while being in contact with the outer diameter ring member, the outer diameter ring member and the reduced diameter section being dimensioned such that seizing of the oriented tube between the expansion device and the at least one outer diameter ring member is avoided, preferably the inside of the oriented tube being radially spaced from the reduced diameter section, and wherein the oriented tube is cooled externally while passing over the run-off part by a first external cooling device.

In an embodiment of this method the non-deformable expansion part causes the entirety of the circumferential expansion of the tube from its preform condition to the expanded condition. Possibly a relatively thin layer of fluid, acting primarily as a lubricant, is present between the expansion device and the tube. For instance the expansion device is embodied as a rigid expansion device, with a run-on part, expansion part, and run-off part of non-deformable design, e.g., of metal. Such designs, often indicated as expansion mandrel, are known in the art.

In another embodiment of this method the non-deformable expansion part only causes a part of the total expansion of the tube. The other part of the desired expansion is then caused by forming a fluid volume between the expansion device and the tube, e.g., upstream and/or downstream of the region wherein the tube contacts the expansion part. These one or more fluid volumes, e.g., gas filled, are then operated to exert an internal fluid pressure on the tube that causes the other part or parts of the expansion of the tube.

In an exemplary embodiment the maximum diameter of the non-deformable expansion part governs the final stage of expansion in circumferential direction of the tube. In this embodiment any part of the expansion device—other than the reduced diameter section—downstream of the maximum diameter has a diameter at most equal to the maximum diameter of the expansion part.

In another possible embodiment a downstream portion, e.g., an end portion, of the run-off part has a greater diameter than the maximum diameter of the expansion part, and a fluid volume with pressurized fluid between the reduced diameter section and the tube is used to cause further expansion of the tube.

It is preferred for the run-off part to be of non-deformable design. However it is also envisaged e.g., that the run-off part includes an expandable portion, e.g., an inflatable plug, e.g., at the downstream end thereof, e.g., limiting the downstream end of the reduced diameter section.

The reduced diameter section preferably has a diameter that is at least 4 millimeters less than the maximum diameter of the expansion part. Preferably the diameter of the reduced diameter section is about twice the wall thickness of the tube passing over the run-off part of the expansion device less than the maximum diameter of the expansion part. Preferably the reduced diameter section has a diameter of at least 80% of the maximum diameter of the expansion part.

The outer diameter ring member is arranged around the reduced diameter section, with the radial spacing between the ring member and the reduced diameter section being more than the projected wall thickness of the tube at the location, so that radial play remains that allows for a possible variation in the wall thickness of the tube during the production process at the location, e.g., to minor disturbances in the process, without the risk that the tube becomes stuck between the ring member and the reduced diameter section of the run-off part. Preferably a radial spacing is maintained between the reduced diameter section and the inside of the oriented tube.

Preferably each outer diameter ring member is non-deformable, at least as the diameter of its opening through which the tube passes is concerned, under the influence of the contact with the tube passing through the opening of the ring member. E.g., the ring member is made of a rigid material, e.g., a metal or other thermally conductive material.

In a practical embodiment each ring member has an axial dimension less than the diameter of the opening therein for the tube. E.g., a ring member has an axial length of between 0.5 and 5 centimeters. It is however also possible that a ring member is formed as an elongated sleeve, e.g., having a length greater than the diameter of the opening therein for the tube.

In a possible embodiment an outer diameter ring member includes one or more internal conduits, e.g., annular internal conduits, through which a cooling fluid is passed, e.g., cooling water, to effect a cooling of the contact surface with the oriented tube. In a possible embodiment the first external cooling device is integrated with the one or more outer diameter ring members, as each ring member has one or more internal conduits through which cooling fluid is passed, e.g., a single outer diameter ring member being used having a length greater that the diameter of the opening therein for the tube, e.g., between one and two times the diameter.

The external cooling of the tube by the first external cooling device while passing over the run-off section is preferably performed in the absence of internal cooling of the tube while passing over the expansion device, or even more preferably also in the absence of any internal cooling downstream of the expansion device.

In this regard referral is made to EP 823 873 wherein not only an external cooling of the oriented tube is performed, but also an internal cooling of the tube is performed by a cooling liquid film between the tube and the run-off part in combination with the passing of the tube through an outer diameter calibrating ring member downstream of the expansion device. It has been found that supplying the cooling liquid to the expansion device is problematic in view of obtaining a uniformly tempered tube in preform condition as the cooling liquid is supplied via a cooling liquid duct in the anchoring rod of the expansion device. It has also been observed that this particular prior art approach may cause deformation of the rather cold inner side of the oriented tube due to the passing through the downstream calibrating ring member, which deformation in cold condition is considered by the present inventors to have a negative effect on the strength of the finally obtained tube.

It is noted that the method of another aspect of the invention allows dispensing with an outer diameter calibration of the oriented tube downstream of the expansion device, which is therefore an exemplary embodiment of the method. In order to arrive at a tube with desired dimensions, without using an outer diameter calibration downstream of the expansion device, it has now been found possible to rely on the use of one or more outer diameter ring members at the location of the run-off part in combination with external cooling of the tube at the location, preferably when also using a second external cooling device downstream of the expansion device, and in combination with the so-called snap-back effect. This snap-back effect has already been observed and documented by professionals in the art, and is visible as a reduction of the tube diameter directly downstream of the expansion device. It is believed that this snap-back effect primarily is the result of the tensile force exerted by the downstream drawing device and the condition of the thermoplastic material of the tube as it leaves the expansion device and is no longer internally supported by the expansion device.

In an exemplary embodiment use is made of an upstream outer diameter ring member and a downstream outer diameter ring member, the ring members being arranged in series and spaced apart. Through these ring members the oriented tube passes at the location of the reduced diameter section of the run-off part. By providing multiple, preferably two, ring members at spaced apart axial locations along the reduced diameter section of the run-off part, various possibilities are provided for the operator to influence the production process and the finally obtained tubing.

Preferably the first external cooling device cools the oriented tube between the upstream and downstream outer diameter ring members. Preferably an intense external cooling is effected here, preferably by the outer surface of the tube being exposed, so not covered by the one or more ring members, and subjected to sprays or jets of cooling liquid, e.g., water.

In an exemplary embodiment at least one outer diameter ring member, e.g., both an upstream and a downstream ring member, is embodied as a constrictive outer diameter ring member, the ring member exerting a radial constrictive force on the oriented tube passing there through during the production process, thereby reducing the outer diameter of the oriented tube, at least over a short axial length. In an exemplary embodiment the upstream outer diameter ring member exerts a constrictive force on the oriented tube which contributes to a sealing engagement of the oriented tube with the expansion device at the transition between the expansion part and the run-off-part. As will be explained in more detail below this approach is e.g., favorable when a fluid, that is a liquid or a gas, is introduced between one or more parts of the expansion device on the one hand and the tube on the other hand.

In an exemplary embodiment at least one outer diameter ring member, e.g., an upstream ring member, is displaceable in axial direction. By suitable selection and/or adaptation of the axial position of the one or more outer diameter ring members with respect to the run-off part, e.g., the snap-back effect can be influenced and thus the final dimension of the oriented tube controlled. In particular it is envisaged that the axial displacement of one or more outer diameter ring members is effected in combination with a control, and—possibly automatic—adjustment, of the cooling effect of the first external cooling device.

In a very practical embodiment the first external cooling device operates with one or more nozzles emitting sprays or jets of cooling liquid, e.g., cooling water.

In an exemplary embodiment the first external cooling device is adapted and operated to adjust the length and/or location with respect to the expansion device of the stretch of the oriented tube that is affected by the first external cooling device. It has been found that by suitable selection of the length, and preferably also the location, of the affected stretch with respect to the expansion device, the occurrence of the snap-back effect can be influenced, and so the diameter of the tube, without needing to use an outer diameter calibration downstream of the expansion device.

In an exemplary embodiment the first external cooling device comprises an upstream shield member and a downstream shield member, the shield members delimiting the stretch of oriented tube that is affected by the first external cooling device, e.g., the sprays or jets of cooling water. Preferably the outer surface of the tube is exposed between the shield members, the device having nozzles spraying or jetting cooling liquid directly onto the exposed surface.

Preferably the first external cooling device is effective directly downstream of the transition between the expansion part and the run-off part, in particular when no internal cooling is performed as is preferred.

Preferably at least one of the shield members of the first external cooling device, preferably both, is displaceable in axial direction, thereby allowing adjusting the length and/or the location of the stretch of tube that is affected by the spray of cooling liquid. It will be appreciated that by controlling the length and/or position of the shield members during the production process, e.g., automatically or operator controlled, possibly by hand, the cooling of the oriented tube can be controlled, even more when—as is common—the intensity of the cooling spray can be controlled as well.

It will be appreciated that the one or more displaceable shield members could be construed for a manual adjusting of the axial position thereof. However in a more advanced embodiment—as is preferred—a motorized drive assembly, e.g., including one or more screw spindles, is provided for the one or more displaceable shield members.

In a very practical embodiment an outer diameter ring member is integral with a shield member, more preferably the upstream and downstream ring member each being integral with the upstream and downstream shield member. As a result the first external cooling device is effective over the stretch of oriented tubing between both ring members, preferably at least one thereof being movable in axial direction.

In an exemplary embodiment the run-off part of the expansion device comprises an increased diameter portion, preferably non-deformable, downstream of the one or more outer diameter ring members and delimiting the downstream end of a reduced diameter section, the increased diameter portion having a greater diameter than the reduced diameter section. The method is then performed such that the oriented tube, preferably in a sealing manner, engages or contacts the increased diameter portion. The increased diameter portion then acts as an internal support for the oriented tube, and in a non-deformable embodiment contributes to the uniformity of the dimensions of the tube.

The presence of an increased diameter portion is advantageous when a fluid is introduced between one or more parts of the expansion device on the one hand and the tube in preform condition and/or oriented tube on the other hand. The increased diameter portion can have a diameter that is the same as the maximum diameter of the expansion part, or a smaller diameter. However, as indicated above, it is also possible for the increased diameter portion to have a larger diameter than the maximum diameter of the expansion part, preferably a pressurized gas volume being then delimited at its downstream end by the increased diameter portion and the internal gas pressure causing a final stage of circumferential expansion of the tube. During normal production the tube will then also contact the expansion part of the expansion device, thereby affecting an earlier stage of expansion of the tube, possibly preceded by yet another expansion stage affected by internal fluid pressure caused by an upstream fluid volume.

In a highly preferred embodiment the run-off part has a single reduced diameter section, and an upstream and downstream outer diameter ring member are arranged at the location of the single reduced diameter section and around the single reduced diameter section. The upstream outer diameter ring member may contribute to or effect a sealing engagement or contact of the tube with the expansion device in a region at or near the maximum diameter of the expansion part. The downstream outer diameter ring member exerts a constrictive force on the tube which may contribute to or effect a sealing engagement of the tube with a downstream located increased diameter portion of the expansion device. This method is highly advantageous when a fluid is introduced between the expansion device, e.g., the run-off part thereof, and the tube. The fluid e.g., is a pressurized gas, such as air, the sealing engagement of the tube at both axial locations of the run-off part avoiding an uncontrolled escape of fluid and thus uncontrolled fluctuation of the fluid volume, be it a thin film (e.g., when a liquid is used, e.g., heated water, is used) or an annular volume with significant radial thickness, e.g., an air volume, e.g., for causing some additional circumferential expansion.

Downstream of the expansion device, preferably in close vicinity to the expansion device, a further external cooling of the tube is advised to cool down oriented tube to a further degree. For this reason a second external cooling device is arranged, preferably relative close, downstream of the expansion device and is adapted and operated to externally cool the oriented tube. The second external cooling device is controllable independent from the first external cooling device arranged at the location of the run-off part. Preferably the second external cooling device is arranged spaced a distance downstream from the first external cooling device.

When the run-off part comprises an increased diameter portion at the downstream end of a single reduced diameter section, it is preferred for a possible second external cooling device to be arranged downstream thereof.

Preferably the second external cooling device comprises one or more cooling liquid spray nozzles adapted and operated to spray or jet cooling liquid, e.g., water, onto the exterior of the oriented tube.

Preferably the second external cooling device is arranged such that the cooling effect thereof starts at the position where the snap-back effect—wherein the diameter of the tube reduces downstream of the expansion with no more internal support of the oriented tube—takes place.

Preferably a dry zone is created between the first and second external cooling device. This is considered to avoid or at least reduce the formation of visual effects, e.g., rings, on the outside of the tube by cooling water.

Preferably the second external cooling device is movable in axial direction, e.g., to adjust its position, primarily of the upstream end thereof, to the occurrence of the snap-back effect. Preferably a displacement device, preferably motorized, is associated with the second external cooling device to affect such a motion.

Preferably the second external cooling device comprises an upstream shield member delimiting the upstream end of the stretch of oriented tubing cooled by the second external cooling device, the upstream shield member preferably being movable in axial direction.

Preferably the upstream end of the second external cooling device, e.g., the upstream shield member thereof, has a flexible annular lip engaging the oriented tube so that no noticeable constrictive force is exerted by the flexible annular lip on the oriented tube.

In an advantageous embodiment use is made of a measuring device for measuring at least one of the outer diameter of the oriented tube, the wall thickness of the oriented tube, and the cross-sectional profile thereof, e.g., the outer diameter and the wall thickness, which measuring device is arranged downstream of the expansion device. A control device is provided to control the first external cooling device and/or the second external cooling device, preferably both when they are both present.

The measuring device is linked to the control device so as to control the cooling by the first and/or second external cooling device, e.g., the intensity of the cooling, thereby controlling the snap-back effect—wherein the diameter of the tube reduces—which takes place directly downstream of the expansion device and thereby controlling the diameter of the oriented tube. This can then be done without the need for any further outer diameter calibration downstream of the expansion device, as is preferred.

In an exemplary embodiment the control device is provided to control the first external cooling device with regard to at least the length and/or location with respect to the expansion device of the stretch of oriented tube that is affected by the first external cooling device.

Possibly the control device is adapted such that the length of the stretch of tube that is affected by the first external cooling device is decreased to obtain an increased snap-back effect and thus increased diameter reduction, and wherein the length is increased to obtain a reduced snap-back effect and thus decreased diameter reduction.

In a possible embodiment the second external cooling device, or an upstream shield member of the second external cooling device, is movable in axial direction, and the measuring device is linked to a control device provided to control the second external cooling device.

The measuring device is linked to the control device of the second external cooling device in order to control the starting point of the cooling of the tube by the second external cooling device, e.g., via controlling the position of the upstream shield member thereof.

Even though it is preferred in another aspect of the invention to dispense with internal cooling of the tube whilst passing over the expansion device, it is preferred to perform the method with the presence of a fluid introduced between one or more parts of the expansion device on the one hand and the tube on the other hand.

The fluid can be a liquid e.g., water, e.g., heated water so as to avoid a noticeable cooling action on the inner side of the tube, preferably the fluid supply device including a controllable heater being provided for heating the liquid.

In an exemplary embodiment the fluid is a pressurized gas, preferably air, preferably a source for pressurized gas, e.g., air, with associated pressure control assembly being provided. More preferably a heated gas, e.g., heated air, is used, preferably a controllable heater being provided for heating the gas.

In an exemplary embodiment a fluid is introduced at least between the run-off part of the expansion device and the tube, preferably at least between the reduced diameter section thereof and the tube. Preferably the tube sealingly engages the expansion device in a region at or near the maximum diameter of the expansion part, and preferably the tube sealingly engages the run-off part downstream of the reduced diameter section, preferably the increased diameter portion thereof. As explained above provision of an upstream and a downstream outer diameter ring member is proposed to contribute to or effect the sealing engagements.

In an exemplary embodiment a first fluid volume is present between the expansion device and the tube at a position upstream of the maximum diameter of the expansion part, and a second fluid volume is present between the run-off part and the tube. The sealing engagement in a region at or near the maximum diameter of the expansion part generally prevents an uncontrolled communication between the two fluid volumes and thus e.g., instability of the fluid volumes and/or mixing of fluids, e.g., upstream pressurized air for the first volume and a liquid, e.g., heated water being used for the second volume.

In a possible embodiment use is made of an expansion device with a valve controlled passage in communication with the first fluid volume and with the second fluid volume, wherein the expansion device includes at least one fluid supply conduit which introduces fluid into the first and/or second fluid volume. As mentioned above the sealing engagement at the maximum diameter avoids an uncontrolled communication between the fluid volumes. The valve controlled passage however allows the operator to e.g., equalize pressure in both volumes, or first establish a first fluid filled volume upstream of the maximum diameter sealing region and then let the fluid flow into the second volume downstream of the region. One or more pressure sensors may be provided to sense the actual fluid pressure in a fluid volume. The valve controlled passage, including the valve, can be integrated entirely in the expansion device in the lumen of the tube. However it is also possible for this valve controlled passage to be present outside of the tube and extruder, e.g., as part of the external portion of the fluid supply device.

It is also an option that a first fluid supply duct introduces fluid into the first fluid volume and a second fluid supply duct introduces fluid into the second fluid volume. The fluids may be the same or different, e.g., water and air.

In particular it is envisaged in this preferred embodiment to provide the expansion device with one or more fluid supply ducts having one or more ports in the outer surface of the run-on part and/or expansion part preferably the run-on part being provided with a sealing member according to one aspect of the invention.

Possibly, e.g., when a liquid fluid is used that is entrained by the moving tube, one or more fluid discharge ducts are provided in the expansion device, the ducts having one or more discharge ports in the outer surface of e.g., the run-off part, e.g., near the downstream end of the reduced diameter section.

In particular when use is made of a fluid between the expansion device and the tube, the fluid forming a film or thicker annular volume at least in the reduced diameter section of the run-off part of the expansion device, then it is considered advantageous to make use of two outer diameter ring members spaced apart from one another and even more advantageous to embody the run-off part with an increased diameter portion delimiting the downstream end of the reduced diameter section, such that the oriented tube sealingly engages the increased diameter portion. This avoids or at least limits any leakage of fluid into the lumen of the oriented tube downstream of the expansion device, and thus avoids undesirable instability of the fluid volume. Most preferably the downstream outer diameter ring member is located somewhat upstream of the increased diameter portion, thereby enhancing the sealing contact between the tube and the increased diameter portion.

In a possible embodiment one or more rollers are arranged below oriented tube so as to support the tube, e.g., below the run-off part of the expansion device.

In a practical embodiment an upstream replaceable ring is fitted on the expansion device, which ring defines the maximum diameter of the expansion part, possibly the adjoining portion of the run-off part having a smaller diameter, so that a stepped transition is present between the parts. The replaceable ring allows for relatively easy change of the maximum diameter of the expansion device as well as replacement of the portion in case of wear.

In a practical embodiment a downstream replaceable ring is fitted at the downstream end of the run-off section, the replaceable ring having a diameter greater than the upstream portion of the run-off part of the expansion device. This allows for relatively easy change of the diameter of the expansion device at the downstream location as well as replacement of the zone in case of wear.

In an embodiment an upstream replaceable ring is fitted at a transition from the expansion part to the run-off part of the expansion device, the replaceable ring defining the maximum diameter of the expansion part.

In an embodiment a downstream replaceable ring is fitted at the downstream end of the run-off section, the replaceable ring having a diameter greater than the upstream portion of the run-off part.

Another aspect of the invention also relates to an installation.

Another aspect of the invention also relates to the combination of an expansion device and at least one outer diameter ring member for use in a method for producing a biaxially oriented tube from thermoplastic material, wherein a tempered tube in preform condition is drawn over the expansion device and passes through the at least one outer diameter ring member, wherein the expansion device comprises a non-deformable expansion part having a gradually increasing diameter to a maximum diameter at a downstream end thereof, which expansion part is adapted to be contacted by the tube and to exerts an expanding force on the tube so as to bring about expansion of the tempered tube in circumferential direction, a run-off part adjoining the expansion part at the downstream end thereof, wherein the run-off part has a reduced diameter section, preferably a single reduced diameter section, having a smaller diameter than the maximum diameter of the expansion part, and wherein the at least one outer diameter ring member is arranged around the reduced diameter section, so that—in use—the oriented tube passes through the outer diameter ring member while being in contact with the outer diameter ring member, the outer diameter ring member and the reduced diameter section being dimensioned such that seizing of the oriented tube between the expansion device and the at least one outer diameter ring member is avoided.

Another aspect of the present invention relates to a method for producing a biaxially oriented tube from thermoplastic material, wherein a tube in preform condition is extruded from thermoplastic material using an extruder which is provided with an extruder die head having an inner die member, the inner die member forming a lumen in the tube, wherein the tube in preform condition is subjected to a temperature conditioning, so that a tempered tube in preform condition is obtained having an orientation temperature which is suitable for the thermoplastic material, and wherein use is made of an expansion device, the expansion device comprising a non-deformable expansion part having a gradually increasing diameter to a maximum diameter at downstream end thereof, which expansion part is contacted by the tube and exerts an expanding force on the tube so as to bring about an expansion of the tempered tube in circumferential direction, a run-on part which is located upstream of the expansion part, a run-off part which is located downstream of the expansion part.

The method comprises drawing the tempered tube over the expansion device using a drawing device which is arranged downstream of the expansion device and acts on the tube, in such a manner that the tube is transformed from a tube in preform condition into a biaxially oriented tube with thermoplastic material which is oriented in axial direction and in circumferential direction of the tube. The biaxially oriented tube is cooled.

In the method according to yet another aspect of the invention use is made of a expansion device having one or more fluid supply ducts, the one or more fluid supply ducts having a port in the outer surface of the expansion device, and fluid that is supplied via the one or more supply ducts forms a first fluid volume between the expansion device and the tube upstream of a sealing engagement of the tube in a region at or near the maximum diameter of the expansion part, and fluid supplied via the one or more supply ducts forms a second fluid volume between the run-off part and the tube. In this method use is made of a expansion device with a communication passage, preferably a valve controlled passage, extending between the first and second fluid volumes, e.g., allowing to obtain a controlled equalization of fluid pressure in the first and second volume and/or the filling/emptying of a fluid volume via a duct in direct communication with the other fluid volume. The valve e.g., is an electrically operated valve mounted at the rear end of the expansion device.

Yet another aspect of the invention also relates to an installation for producing a biaxially oriented tube from thermoplastic material, which installation comprises an extruder with an extruder die head having an inner die member adapted to extrude a tube in preform condition from thermoplastic material, the inner die member forming a lumen in the tube, one or more tempering devices for temperature conditioning of the tube in preform condition, so that a tempered tube in preform condition is obtained having an orientation temperature which is suitable for the thermoplastic material, an expansion device in the lumen downstream of the extruder, the expansion device comprising a non-deformable expansion part having an increasing diameter to a maximum diameter at downstream end thereof, which expansion part is adapted to be contacted by the tube during normal production of the tube and then exerts an expanding force on the tube so as to bring about an expansion of the tempered tube in circumferential direction, a run-on part upstream of the expansion part, a run-off part downstream of the expansion part, one or more fluid supply ducts, the one or more fluid supply ducts having a port in the outer surface of the expansion device, a fluid supply device for supplying fluid to the one or more supply ducts, allowing to establish an upstream fluid volume between the tube and the run-on part and a downstream fluid volume between the tube and the run-of part during normal production, a drawing device which is arranged downstream of the expansion device and is adapted to act on the tube, in such a manner that the tube is transformed from a tube in preform condition into a biaxially oriented tube with thermoplastic material which is oriented in axial direction and in circumferential direction of the tube, a cooling device that is adapted to cool the biaxially oriented tube.

The installation according to yet another aspect of the invention is characterized in that the installation comprises a communication passage, e.g., an internal passage in the expansion device that allows bringing the upstream fluid volume and the downstream fluid volume in communication.

Preferably a control valve is provided for the communication passage, allowing selectively opening and closing the communication passage.

It will be understood that this installation can be combined with features mentioned in relation to of one or more of the other aspects of the invention.

The presence of the valve controlled communication passage may also be used advantageously when starting-up the method according to yet another aspect of the invention. An example thereof is a method for starting-up production of biaxially oriented thermoplastic tubing, wherein use is made of an installation according to mentioned preferred embodiment of yet another aspect of the invention, wherein fluid is first only supplied to one or more supply ducts emerging in the upstream fluid volume—with the communication passage closed—and only when the tube is in sealing contact with both the expansion part and a downstream portion of the run-off part then fluid is introduced into the downstream fluid volume, which introduction may be effected by opening the communication passage or feeding fluid to a separate fluid supply conduit.

In yet another aspect of the invention the run-off part may well be a non-deformable part, however an expandable, e.g., inflatable portion of the run-off part sealingly engaging the tube is also possible. The same holds true for any sealing member between the run-on part and the tube, when present.

Another aspect of the present invention relates to a method for producing a biaxially oriented tube from thermoplastic material, wherein a tube in preform condition is extruded from thermoplastic material using an extruder which is provided with an extruder die head having an inner die member, the inner die member forming a lumen in the tube, wherein the tube in preform condition is subjected to a temperature conditioning by one or more tempering devices so that a tempered tube in preform condition is obtained having an orientation temperature which is suitable for the thermoplastic material. In this method use is made of an expansion device arranged within the lumen downstream of the extruder, and a fluid volume is formed between the expansion device and the tube, the fluid volume being delimited at the downstream end thereof by a downstream sealing portion of the expansion device, preferably a non-deformable downstream sealing portion.

Use is further made of a drawing device arranged downstream of the expansion device, and the method comprises passing the tempered tube over the expansion device using the drawing device, in such a manner that the tube is transformed from a tube in preform condition into a biaxially oriented tube with the thermoplastic material being oriented in axial direction and in circumferential direction. The biaxially oriented tube is cooled.

In this method the expansion device may include a non-deformable expansion part, and possibly also a run-off part with reduced diameter section, e.g., as explained with reference to other aspects of the invention.

It is also envisaged that the method of another aspect of the invention is advantageous when the expansion device causes expansion of the tube solely on the basis of the presence of a pressurized fluid volume within the lumen of the tube, the fluid volume being retained between an upstream sealing member and a downstream sealing member. This approach is generally known in the art, often the downstream sealing member being expandable, e.g., inflatable, to cause a sealing engagement with the inside of the tube. In known approach an elongated sizing sleeve is used in this method, that extends from a position upstream of the downstream plug to a position downstream of the downstream sealing plug, and the inflatable plug pressing the tube against the inside of the sizing sleeve.

Another aspect of the invention aims to provide an improved method, at least a useful alternative method.

Another aspect of the invention provides a method for producing a biaxially oriented tube from thermoplastic material, wherein a tube in preform condition is extruded from thermoplastic material using an extruder which is provided with an extruder die head having an inner die member, the inner die member forming a lumen in the tube, wherein the tube in preform condition is subjected to a temperature conditioning by one or more tempering devices so that a tempered tube in preform condition is obtained having an orientation temperature which is suitable for the thermoplastic material, and wherein use is made of an expansion device arranged within the lumen downstream of the extruder, and wherein a fluid volume is formed between the expansion device and the tube, the fluid volume being delimited at the downstream end thereof by a downstream sealing portion of the expansion device, preferably a non-deformable downstream sealing portion, and wherein use is made of a drawing device arranged downstream of the expansion device, wherein the method comprises passing the tempered tube over the expansion device using the drawing device, in such a manner that the tube is transformed from a tube in preform condition into a biaxially oriented tube with the thermoplastic material being oriented in axial direction and in circumferential direction, wherein the biaxially oriented tube is cooled.

The method is characterized in that use is made of an outer diameter ring member that is arranged at a spacing upstream of the downstream sealing portion of the expansion device, the tube passing through the outer diameter ring member while being in contact with the outer ring member, the outer ring member being embodied as a constrictive outer ring member and exerting a radial constrictive force on the tube passing there through that contributes to the sealing engagement of the tube with the downstream sealing portion of the expansion device.

As will be understood the inventors envisage that no external part of an installation engages on the outside of the tube at the location of the downstream sealing portion of the expansion device. It is noted that squeezing the tube between an expandable plug and the sizing sleeve may cause instabilities as well as minute damage to the tube, thereby impairing the strength, long term stability and uniformity of the finally obtained tube.

Most preferably the downstream sealing portion of the expansion device is non-deformable. This enhances uniformity of the finally obtained tube and stability of the production process, e.g., compared to the use of an inflatable plug which is inherently less stable in its cross-sectional dimensions.

Preferably a first cooling device is employed to cool the tube upstream of the outer diameter ring member nearest to the downstream sealing member, e.g., a first external cooling device as explained with reference to one or more other aspects of the invention.

Another aspect of the invention also relates to an installation for producing a biaxially oriented tube from thermoplastic material, which installation comprises an extruder with an extruder die head having an inner die member adapted to extrude a tube in preform condition from thermoplastic material, the inner die member forming a lumen in the tube, one or more tempering devices for temperature conditioning of the tube in preform condition, so that a tempered tube in preform condition is obtained having an orientation temperature which is suitable for the thermoplastic material, an expansion device in the lumen downstream of the extruder, the expansion device comprising a downstream sealing portion, preferably a non-deformable downstream sealing portion one or more fluid supply ducts, the one or more fluid supply ducts having a port in the outer surface of the expansion device, a fluid supply device for supplying fluid to the one or more supply ducts, allowing to establish an upstream fluid volume between the tube and the expansion device, the fluid volume being delimited at its downstream end by the downstream sealing portion, a drawing device which is arranged downstream of the expansion device and is adapted to act on the tube, in such a manner that the tube is transformed from a tube in preform condition into a biaxially oriented tube with thermoplastic material which is oriented in axial direction and in circumferential direction of the tube, a cooling device that is adapted to cool the biaxially oriented tube.

The installation is characterized in that an outer diameter ring member is arranged at a spacing upstream of the downstream sealing portion of the expansion device, the outer diameter ring member being adapted so that the tube passes through the outer diameter ring member while being in contact with the outer ring member during normal production, the outer ring member being embodied as a constrictive outer ring member and exerting a radial constrictive force on the tube passing there through that contributes to the sealing engagement of the tube with the downstream sealing portion of the expansion device.

It will be understood that this installation can be combined with features mentioned in relation to one or more of the other aspects of the invention, e.g., the presence of two outer diameter ring members, possibly one or more being mobile, as explained with reference to another aspect of the invention.

Another aspect of the present invention relates to a method for producing a biaxially oriented tube from thermoplastic material, wherein a tube in preform condition is extruded from thermoplastic material using an extruder which is provided with an extruder die head having an inner die member, the inner die member forming a lumen in the tube, wherein the tube in preform condition is subjected to a temperature conditioning by one or more tempering devices so that a tempered tube in preform condition is obtained having an orientation temperature which is suitable for the thermoplastic material.

Use is made of an expansion device arranged within the lumen downstream of the extruder, and a fluid volume is formed between the expansion device and the tube, the fluid volume being delimited at the downstream end thereof by a downstream sealing portion of the expansion device, preferably a non-deformable downstream sealing portion. Also use is made of a drawing device arranged downstream of the expansion device, and the method comprises passing the tempered tube over the expansion device using the drawing device, in such a manner that the tube is transformed from a tube in preform condition into a biaxially oriented tube with the thermoplastic material being oriented in axial direction and in circumferential direction. The biaxially oriented tube is cooled.

It is an object of yet another aspect of the invention to provide an improved method, or at least an alternative method.

It is a further object of yet another aspect of the invention to provide a method with enhanced external cooling of the expanded tube, preferably in light of the possibility to control the snap-back effect.

Yet another aspect of the invention provides a method for producing a biaxially oriented tube from thermoplastic material, wherein a tube in preform condition is extruded from thermoplastic material using an extruder which is provided with an extruder die head having an inner die member, the inner die member forming a lumen in the tube, wherein the tube in preform condition is subjected to a temperature conditioning by one or more tempering devices so that a tempered tube in preform condition is obtained having an orientation temperature which is suitable for the thermoplastic material, and wherein use is made of an expansion device arranged within the lumen downstream of the extruder, and wherein a fluid volume is formed between the expansion device and the tube, the fluid volume being delimited at the downstream end thereof by a downstream sealing portion of the expansion device, preferably a non-deformable downstream sealing portion, and wherein use is made of a drawing device arranged downstream of the expansion device, wherein the method comprises passing the tempered tube over the expansion device using the drawing device, in such a manner that the tube is transformed from a tube in preform condition into a biaxially oriented tube with the thermoplastic material being oriented in axial direction and in circumferential direction, wherein the biaxially oriented tube is cooled.

The method is characterized in that use is made of a first external cooling device for cooling the tube upstream of the downstream sealing portion of the expansion device, wherein the first external cooling device comprises an upstream shield member and a downstream shield member, the shield members delimiting the stretch of tube that is affected by the first external cooling device, e.g., the sprays or jets of cooling water, and wherein the downstream shield member is arranged upstream of the downstream sealing portion of the expansion device.

Preferably at least one of the shield members, preferably both, is displaceable in axial direction, thereby allowing adjusting the length and/or the location of the stretch of tube that is affected by the first external cooling device.

Preferably the oriented tube is in contact with at least one of the shield members, preferably both shield members.

Preferably a measuring device for measuring at least one of the outer diameter of the tube, the wall thickness of the tube, and/or the cross-sectional profile thereof, is arranged downstream of at least the first external cooling device, wherein a control device is provided to control the first external cooling device, and wherein the measuring device is linked to the control device so as to control the cooling by the first external cooling device, e.g., the intensity of the cooling.

Preferably the control device is adapted and operated to control the first external cooling device with regard to at least the length and/or location with respect to the mandrel of the stretch of oriented tube that is affected by the first external cooling device.

Yet another aspect of the invention also relates to an installation for producing a biaxially oriented tube from thermoplastic material, which installation comprises an extruder with an extruder die head having an inner die member adapted to extrude a tube in preform condition from thermoplastic material, the inner die member forming a lumen in the tube, one or more tempering devices for temperature conditioning of the tube in preform condition, so that a tempered tube in preform condition is obtained having an orientation temperature which is suitable for the thermoplastic material, an expansion device in the lumen downstream of the extruder, the expansion device comprising: a downstream sealing portion, preferably a non-deformable downstream sealing portion one or more fluid supply ducts, the one or more fluid supply ducts having a port in the outer surface of the expansion device, a fluid supply device for supplying fluid to the one or more supply ducts, allowing to establish an upstream fluid volume between the tube and the expansion device, the fluid volume being delimited at its downstream end by the downstream sealing portion, a drawing device which is arranged downstream of the expansion device and is adapted to act on the tube, in such a manner that the tube is transformed from a tube in preform condition into a biaxially oriented tube with thermoplastic material which is oriented in axial direction and in circumferential direction of the tube, a first external cooling device for cooling the tube upstream of the downstream sealing portion of the expansion device, wherein the first external cooling device comprises an upstream shield member and a downstream shield member, the shield members delimiting the stretch of tube that is affected by the first external cooling device, preferably the first cooling device having nozzles emitting sprays or jets of cooling liquid, e.g., water, preferably directly on an exposed exterior surface of the tube between the shield members, and wherein the downstream shield member is arranged upstream of the downstream sealing portion of the expansion device.

It will be understood that this installation can be combined with features mentioned in relation to one or more of the other aspects of the invention, e.g., with reference to another aspect of the invention.

Another aspect of the present invention relates to a method for producing a biaxially oriented tube from thermoplastic material, wherein a tubular preform is extruded from thermoplastic material using an extruder which is provided with an extruder die head having an inner die member, the inner die member forming a lumen in the preform, wherein the preform is subjected to a temperature conditioning by one or more tempering devices so that a tempered preform is obtained having an orientation temperature which is suitable for the thermoplastic material of the preform.

Use is made of an expansion device arranged within the lumen downstream of the extruder, and a fluid volume is formed between the expansion device and the preform, the fluid volume being delimited at the downstream end thereof by a downstream sealing portion of the expansion device, preferably a non-deformable downstream sealing portion. Also use is made of a drawing device arranged downstream of the expansion device, and the method comprises passing the tempered preform over the expansion device using the drawing device, in such a manner that the preform is transformed into a biaxially oriented tube with the thermoplastic material being oriented in axial direction and in circumferential direction. The biaxially oriented tube is cooled.

It is an object of another aspect of the invention to provide an improved method, or at least an alternative method.

It is a further object of another aspect of the invention to provide a method with enhanced external cooling of the expanded tube, preferably in light of the possibility to control the snap-back effect.

The method according to another aspect of the invention is a method for producing a biaxially oriented tube from thermoplastic material, wherein a tube in preform condition is extruded from thermoplastic material using an extruder which is provided with an extruder die head having an inner die member, the inner die member forming a lumen in the tube in preform condition, wherein the tube in preform condition is subjected to a temperature conditioning by one or more tempering devices so that a tempered tube in preform condition is obtained having an orientation temperature which is suitable for the thermoplastic material, and wherein use is made of an expansion device arranged within the lumen downstream of the extruder, and wherein a fluid volume is formed between the expansion device and the tube, the fluid volume being delimited at the downstream end thereof by a downstream sealing portion of the expansion device, preferably a non-deformable downstream sealing portion, and wherein use is made of a drawing device arranged downstream of the expansion device, wherein the method comprises passing the tempered tube over the expansion device using the drawing device, in such a manner that the tube is transformed from a tube in preform condition into a biaxially oriented tube with the thermoplastic material being oriented in axial direction and in circumferential direction, wherein the biaxially oriented tube is cooled.

The method is characterized in that use is made of a first external cooling device for cooling the oriented tube upstream of the downstream sealing portion of the expansion device, and in that use is made of a second external cooling device, that is arranged downstream of the expansion device, which second external cooling device is adapted and operated to externally cool the oriented tube, the second external cooling device being controlled independent from the first external cooling device, the second external cooling device preferably comprising one or more cooling liquid spray nozzles adapted to spray or jet cooling liquid, e.g., water, onto the exterior of the oriented tube.

It will be appreciated that the first and/or second cooling device preferably include one or more features of the first and/or second external cooling devices discussed with reference to one or more other aspects of the invention, e.g., another aspect of the invention.

Preferably the second external cooling device is arranged spaced a distance downstream from the first external cooling device, preferably a dry zone being maintained between the first and second external cooling devices during operation.

Preferably the second external cooling device is located to with its upstream end in a region where the snap-back effect—wherein the diameter of the tube reduces—takes place downstream of the expansion device.

Preferably the second external cooling device is mobile, e.g., by a motorized displacement device, in axial direction to adjust the starting point of the cooling by the second external cooling device.

Preferably the first external cooling device is mobile in axial direction to adjust the location, and possibly length, of the stretch of oriented tube cooled by the first external cooling device. Preferably the first external cooling device is embodied having one or more features as discussed with reference to one or more other aspects of the present invention. For instance the first external cooling device has an upstream and downstream shield member, as well as one or more nozzles spraying or jetting cooling water onto the exposed tube section between the shield members to achieve an intense cooling.

In an exemplary embodiment the second external cooling device is adapted and operated to adjust the axial location of the starting point of the cooling of the tube caused by the second external cooling device, e.g., to control the snap-back effect, for example the second external cooling device comprising an upstream shield member delimiting the upstream end of the stretch of oriented tubing affected by the second external cooling device, the upstream shield member being movable in axial direction, the upstream shield member preferably having a flexible annular lip engaging the oriented tube.

In an exemplary embodiment the second external cooling device comprises an upstream shield member delimiting the upstream end of the stretch of oriented tubing affected by the second external cooling device, the upstream shield member preferably being movable in axial direction, the upstream shield member preferably having a flexible annular lip engaging the oriented tube.

In an exemplary embodiment a measuring device for measuring at least one of the outer diameter of the oriented tube, the wall thickness, and/or cross-sectional profile thereof, is arranged downstream of at least the first external cooling device, possibly downstream of the second external cooling device, and a control device is provided to control the first external cooling device and/or the second external cooling device, and wherein the measuring device is linked to the control device so as to control the cooling by the first external cooling device and/or the second external cooling device, e.g., the intensity of the cooling.

Preferably the control device is adapted and operated to control the first external cooling device with regard to at least the length and/or location with respect to the mandrel of the stretch of oriented tube that is affected by the first external cooling device.

Another aspect of the invention also relates to an installation for producing a biaxially oriented tube from thermoplastic material, which installation comprises an extruder with an extruder die head having an inner die member adapted to extrude a tube in preform condition from thermoplastic material, the inner die member forming a lumen in the tube, one or more tempering devices for temperature conditioning of the tube in preform condition, so that a tempered tube in preform condition is obtained having an orientation temperature which is suitable for the thermoplastic material, an expansion device in the lumen downstream of the extruder, the expansion device comprising a downstream sealing portion, preferably a non-deformable downstream sealing portion one or more fluid supply ducts, the one or more fluid supply ducts having a port in the outer surface of the expansion device, a fluid supply device for supplying fluid to the one or more supply ducts, allowing to establish an upstream fluid volume between the tube and the expansion device, the fluid volume being delimited at its downstream end by the downstream sealing portion, a drawing device which is arranged downstream of the expansion device and is adapted to act on the tube, in such a manner that the tube is transformed from a tube in preform condition into a biaxially oriented tube with thermoplastic material which is oriented in axial direction and in circumferential direction of the tube, a first external cooling device for cooling the tube upstream of the downstream sealing portion of the expansion device, a second external cooling device, that is arranged downstream of the expansion device, which second external cooling device is adapted and operated to externally cool the oriented tube, the second external cooling device being controllable independent from the first external cooling device, the second external cooling device preferably comprising one or more cooling liquid spray nozzles adapted to spray or jet cooling liquid, e.g., water, onto the exterior of the oriented tube.

It will be understood that this installation can be combined with features mentioned in relation to one or more of the other aspects of the invention, e.g., with reference to a first and/or a second aspect of the invention.

Another aspect of the present invention relates to a method for producing a biaxially oriented tube from thermoplastic material, wherein a tube in preform condition is extruded from thermoplastic material using an extruder which is provided with an extruder die head having an inner die member, the inner die member forming a lumen in the tube, wherein the tube in preform condition is subjected to a temperature conditioning by one or more tempering devices so that a tempered tube in preform condition is obtained having an orientation temperature which is suitable for the thermoplastic material of the tube. Use is made of an expansion device arranged within the lumen downstream of the extruder, the expansion device comprising: a non-deformable expansion part having a gradually increasing diameter to a maximum diameter at downstream end thereof, which expansion part is contacted by the tube and exerts an expanding force on the tube so as to bring about expansion of the tempered tube in circumferential direction, a downstream sealing portion of the expansion device, that is located downstream of the expansion part in the lumen and sealingly engages the tube. A fluid volume is formed between the expansion device and the tube, the fluid volume being delimited at the downstream end thereof by the downstream sealing portion of the expansion device, preferably a non-deformable downstream sealing portion. Also use is made of a drawing device arranged downstream of the expansion device, and the method comprises passing the tempered tube over the expansion device using the drawing device, in such a manner that the tube in preform condition is transformed into a biaxially oriented tube with the thermoplastic material being oriented in axial direction and in circumferential direction. The biaxially oriented tube is cooled.

Yet another aspect of the invention has as an object to provide an improved method, or at least a useful alternative.

Yet another aspect of the invention has as further object to allow for a hybrid expansion process of the tube from its preform condition into a biaxially oriented tube, wherein use is made of expansion due to forcing the tube over a non-deformable expansion part as well as expansion caused by internal fluid pressure in the tube as the tube passes over the expansion device.

The method according to yet another aspect is a method for producing a biaxially oriented tube from thermoplastic material, wherein a tube in preform condition is extruded from thermoplastic material using an extruder which is provided with an extruder die head having an inner die member, the inner die member forming a lumen in the tube, wherein the tube in preform condition is subjected to a temperature conditioning by one or more tempering devices so that a tempered tube in preform condition is obtained having an orientation temperature which is suitable for the thermoplastic material of the tube, and wherein use is made of an expansion device arranged within the lumen downstream of the extruder, the expansion device comprising: a non-deformable expansion part having a gradually increasing diameter to a maximum diameter at downstream end thereof, which expansion part is contacted by the tube and exerts an expanding force on the tube so as to bring about expansion of the tempered tube in circumferential direction, a downstream sealing portion of the expansion device, that is located downstream of the expansion part in the lumen and sealingly engages the tube, wherein a fluid volume is formed between the expansion device and the tube, the fluid volume being delimited at the downstream end thereof by the downstream sealing portion of the expansion device, preferably a non-deformable downstream sealing portion, and wherein use is made of a drawing device arranged downstream of the expansion device, wherein the method comprises passing the tempered tube over the expansion device using the drawing device, in such a manner that the tube in preform condition is transformed into a biaxially oriented tube with the thermoplastic material being oriented in axial direction and in circumferential direction, wherein the biaxially oriented tube is cooled.

The method is characterized in that the downstream sealing portion has a diameter that is greater than the maximum diameter of the expansion part, and in that during normal production the tube is in contact with the non-deformable expansion part of the device and expanded by the expansion part, as well as in contact with the downstream sealing portion, a fluid volume being present between the axially spaced contact locations, a fluid pressure within the fluid volume causing further expansion of the tube so as to pass over the downstream sealing portion.

Preferably the fluid is a gas, e.g., air.

In an exemplary embodiment a first external cooling device is arranged generally between the axially spaced contact locations, so as to achieve external cooling of the tube. For instance a first external cooling device having one or more of the features of the first external cooling device described with reference to one or more other aspects of this invention is employed. E.g., the cooling device is adjustable with regard to its position relative to the downstream sealing portion and/or with regard to the length of the section of tube that is cooled, and/or the intensity of the cooling.

In an exemplary embodiment at least one outer diameter ring member is arranged between the axially spaced contact locations. For instance a downstream outer diameter ring member is arranged in close vicinity of the downstream sealing portion, preferably the ring member being embodied as a constrictive ring member that contributes to the sealing engagement between the tube and the downstream sealing member as discussed with reference to one or more of the other aspects of this invention.

In an exemplary embodiment the expansion device furthermore includes an upstream sealing portion, that is arranged upstream of the non-deformable expansion part and sealingly contacts the tube, and wherein a further fluid volume, e.g., a gas volume, is established between the upstream sealing portion and the contact location of the tube with the non-deformable expansion part.

In this manner two fluid volumes are formed between the tube and the expansion device. Preferably the upstream fluid volume is pressurized, e.g., with air, such as to cause expansion of the tube by internal fluid pressure to such a degree that the expanded tube still comes into contact with the non-deformable expansion part of the expansion device. This contact with the expansion part then brings about a further expansion of the tube. A further expansion is then caused by the internal fluid pressure, e.g., air pressure, in the downstream fluid volume, e.g., to such a diameter that the tube contacts the one or more outer ring members (when present in this method) and the passes over the downstream sealing portion of the expansion device.

It is envisaged that the downstream sealing portion itself can be embodied with a gradually increasing diameter portion, thus the sealing portion causing further circumferential expansion of the tube in a noticeable manner.

It is possible in this aspect of the invention that the expansion device includes a run-off part which has a diameter that is identical to the maximum diameter of the preceding expansion part. It is also possible that the run-off part has a reduced diameter section having a smaller diameter than the maximum diameter of the expansion part.

Yet another aspect of the invention also relates to an installation for producing a biaxially oriented tube from thermoplastic material, which installation comprises an extruder with an extruder die head having an inner die member adapted to extrude a tube in preform condition from thermoplastic material, the inner die member forming a lumen in the tube, one or more tempering devices for temperature conditioning of the tube in preform condition, so that a tempered tube in preform condition is obtained having an orientation temperature which is suitable for the thermoplastic material, an expansion device in the lumen downstream of the extruder, the expansion device comprising a non-deformable expansion part having an increasing diameter to a maximum diameter at downstream end thereof, which expansion part is adapted to be contacted by the tube during normal production of the tube and then exerts an expanding force on the tube so as to bring about an expansion of the tempered tube in circumferential direction, a downstream sealing portion of the expansion device, that is located downstream of the expansion part in the lumen and sealingly engages the tube, one or more fluid supply ducts, the one or more fluid supply ducts having a port in the outer surface of the expansion device, a fluid supply device for supplying fluid to the one or more supply ducts, allowing to establish an upstream fluid volume between the tube and the run-on part and a downstream fluid volume between the tube and the run-of part during normal production, a drawing device which is arranged downstream of the expansion device and is adapted to act on the tube, in such a manner that the tube is transformed from a tube in preform condition into a biaxially oriented tube with thermoplastic material which is oriented in axial direction and in circumferential direction of the tube, a cooling device that is adapted to cool the biaxially oriented tube, which installation is characterized in that the downstream sealing portion has a diameter that is greater than the maximum diameter of the expansion part, and in that during normal production the tube is in contact with the non-deformable expansion part of the device and expanded by the expansion part, as well as in contact with the downstream sealing portion, a fluid volume being present between the axially spaced contact locations, a fluid pressure within the fluid volume causing further expansion of the tube so as to pass over the downstream sealing portion.

It will be understood that this installation can be combined with features mentioned in relation to one or more of the other aspects of the invention, e.g., with reference to another aspect of the invention and/or the third and/or another aspect of the invention.

Another aspect of the invention relates to a method and installation for producing a biaxially oriented tube from thermoplastic material, wherein a tube in preform condition is extruded from thermoplastic material using an extruder which is provided with an extruder die head having an inner die member, the inner die member forming a lumen in the tube in preform condition, wherein the tube in preform condition is subjected to a temperature conditioning, so that a tempered tube in preform condition is obtained having an orientation temperature which is suitable for the thermoplastic material, and wherein use is made of an expansion device having a nose end, wherein the expansion device brings about expansion of the tempered tube in preform condition in circumferential direction, for example the expansion device comprising a non-deformable expansion part having a gradually increasing diameter to a maximum diameter at a downstream end thereof, wherein the method comprises drawing the tempered tube over the expansion device using a drawing device which is arranged downstream of the expansion device and acts on the tube, in such a manner that the tube is transformed from a tube in preform condition into a biaxially oriented tube with thermoplastic material which is oriented in axial direction and in circumferential direction of the tube, wherein the biaxially oriented tube is cooled. In the method of this aspect of the invention use is made of one or more temperature sensors that sense the temperature of the inner face of the tube in preform condition upstream of or at the nose end of the expansion device, preferably at a sealing member that is arranged at the nose end of the expansion device, e.g., the one or more temperature sensors being coupled to the one or more external heat exchange devices arranged directly upstream of the expansion device and/or around the expansion device, e.g., the one or more external heat exchange devices being used to influence the sealing engagement of the preform with the sealing member—when present—in order to assist in suitable operation thereof.

Another aspect of the invention relates to a method and installation for producing a biaxially oriented tube from thermoplastic material, wherein a tube in preform condition is extruded from thermoplastic material using an extruder which is provided with an extruder die head having an inner die member, the inner die member forming a lumen in the tube in preform condition, wherein the tube in preform condition is subjected to a temperature conditioning using an external cooling device and an external heating device for the tube in preform condition downstream of the external cooling device, the external cooling device and external heating device being arranged between the extruder die and a preform speed-control device acting on the tube in preform condition, the external heating device being adapted to heat in an adjustable manner one sector of the circumference of the tube, or possibly multiple selected sectors of the circumference of the tube, e.g., only a bottom section of the tube and not the remainder of the circumference of the tube, prior to reaching the preform speed-control device, and wherein use is made of an expansion device downstream of the preform speed-control device, which expansion device brings about expansion of the tempered tube in preform condition in circumferential direction, for example the expansion device comprising a non-deformable expansion part having a gradually increasing diameter to a maximum diameter at a downstream end thereof, and wherein the method comprises drawing the tempered tube over the expansion device using a drawing device which is arranged downstream of the expansion device and acts on the tube, in such a manner that the tube is transformed from a tube in preform condition into a biaxially oriented tube with thermoplastic material which is oriented in axial direction and in circumferential direction of the tube, wherein the biaxially oriented tube is cooled.

Another aspect of the invention relates to a method and installation for producing a biaxially oriented tube from thermoplastic material, wherein a tube in preform condition is extruded from thermoplastic material using an extruder which is provided with an extruder die head having an inner die member, the inner die member forming a lumen in the tube in preform condition, wherein the tube in preform condition is subjected to a temperature conditioning, so that a tempered tube in preform condition is obtained having an orientation temperature which is suitable for the thermoplastic material, and wherein use is made of an expansion device, the expansion device comprising a non-deformable expansion part having a gradually increasing diameter to a maximum diameter at a downstream end thereof, which expansion part is contacted by the tube and exerts an expanding force on the tube so as to bring about expansion of the tempered tube in preform condition in circumferential direction, a run-on part which is located upstream of the expansion part, wherein the method comprises drawing the tempered tube over the expansion device using a drawing device which is arranged downstream of the expansion device and acts on the tube, in such a manner that the tube is transformed from a tube in preform condition into a biaxially oriented tube with thermoplastic material which is oriented in axial direction and in circumferential direction of the tube, wherein the biaxially oriented tube is cooled, wherein use is made of an expansion device having one or more fluid supply ducts, the one or more fluid supply ducts having a port in the outer surface of the run-on part and/or the expansion part of the expansion device, and wherein fluid is introduced and forms a fluid volume between the expansion device and the tube, wherein the fluid supplied to the fluid volume that is limited at one end by the sealing contact between the tube in preform condition and the expansion device, e.g., a sealing member at a nose end thereof, and at another end by sealing engagement between the tube and at least a downstream portion of the expansion part, e.g., near or at the transition to the run-off part, is a gas, e.g., air, the pressure of the gas in the fluid volume being used to cause gradual expansion of the tube already before the tube actually contacts the expansion part, and wherein one or more gas discharge ducts are formed in the expansion device, the one or more discharge ducts having one or more inlet ports in the exterior surface of the expansion part of the expansion device, an inlet port being open or closed or partly closed dependent on whether or not the inlet port is covered and closed by the tube or which portion of the inlet port is closed by the tube, the gas discharge duct providing for the relief of gas pressure from the fluid volume when the one or more corresponding inlet ports are at least partly open thereby controlling the expansion of the tube caused by internal gas pressure.

It will be appreciated that measures explained above with reference to one aspect of the invention can be readily combined with measures explained with reference to another aspect of the invention. Examples thereof will be elucidated with reference to the description of preferred embodiments below.

The aspects of the present invention also relates to the associated installations for performing the methods according to these aspects.

The present invention also relates to an expansion device as included in one or more of these installations for performing one or more of the methods of the invention, as an existing installation may be enhanced by replacing the existing expansion device for such a novel expansion device.

The present invention also relates to a first external cooling device as included in one or more of these installations for performing one or more of the methods of the invention, as an existing installation may be enhanced by adding the first external cooling device, or replacing the existing external cooling device for such a novel first external cooling device.

The present invention also relates to a second external cooling device as included in one or more of these installations for performing one or more of the methods of the invention, as an existing installation may be enhanced by adding the second external cooling device, or replacing the existing external cooling device for such a novel second external cooling device.

The methods according to the invention are for instance suitable to produce individual tube elements that are later provided with a socket in a socketing operation, allowing tubes to be connected end to end by inserting an end into a socketed end of another tube, the socket preferably including a sealing ring.

The methods according to the aspects of the invention may also include the further step of making individual biaxially oriented tubing elements by severing a tubing element from the tube that extends from the extruder, over the expansion device, and beyond the drawing device downstream of the expansion device, e.g., tubing elements having a length between 5 and 15 meters, e.g., 6 meters, and the step of providing a socket on an end of each individual tubing element so that individual tubing elements are connectable via a socket connection.

The present invention also relates to a biaxially oriented tube obtained with a method according to one or more of the aspects of the invention. In an exemplary embodiment the tube is a biaxially oriented tube of polyvinylchloride. In an exemplary embodiment the tube obtained is a water or gas transport pipes, e.g., for potable water, e.g., of polyvinylchloride.

For example it is envisaged to produce with a method according to one or more of the aspects of the invention a biaxially oriented pipe, e.g., of PVC, having a pressure rating above 8 Bar, e.g., of 12.5 Bar, at 20° C., e.g., with an outer diameter between 63 and 630 millimeters.

The wall thickness of the biaxially oriented pipe produced with a method according to one or more of the aspects of the invention may lie in practice between, for example, 3 and 10 millimeters.

Other aspects and features of embodiments of the present invention will become apparent to those of ordinary skill in the art, upon reviewing the following detailed description in conjunction with the accompanying figures.

BRIEF DESCRIPTION OF THE FIGURES

The various embodiments of the invention can be better understood with reference to the following drawings. The components in the drawings are not necessarily to scale, emphasis instead being placed upon clearly illustrating the principles of the various embodiments of the present invention. In the drawings, like reference numerals designate corresponding parts throughout the several views.

DETAILED DESCRIPTION OF PREFERRED EMBODIMENTS

Figure 1A:
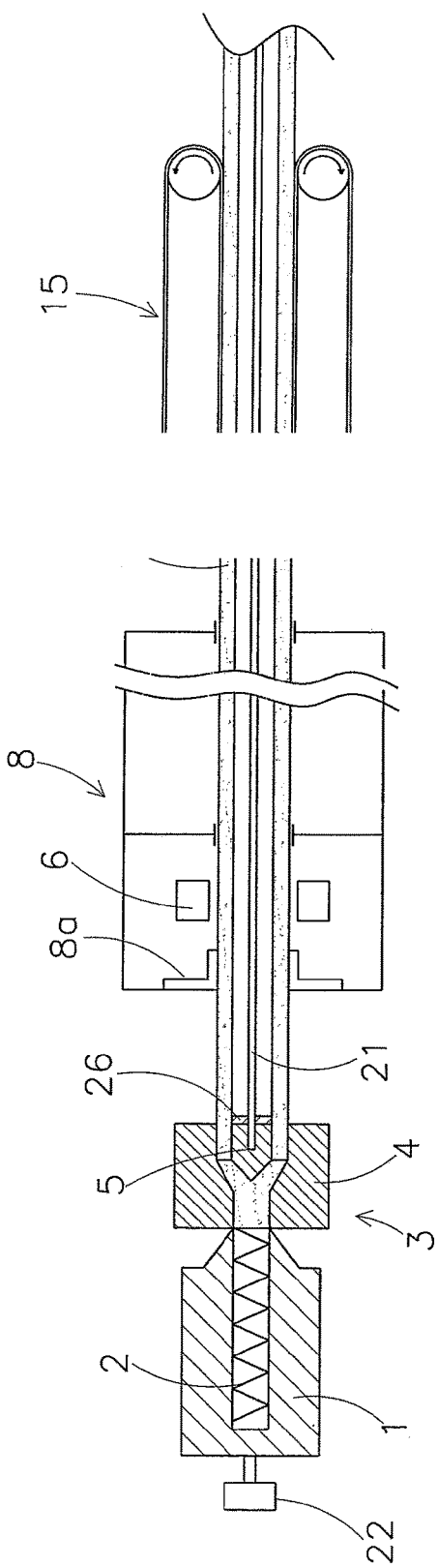
FIGS. 1a, 1b and 1c show schematically an example of an installation for producing biaxially oriented thermoplastic tubing which includes many aspects of the present invention.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Figure 1B:
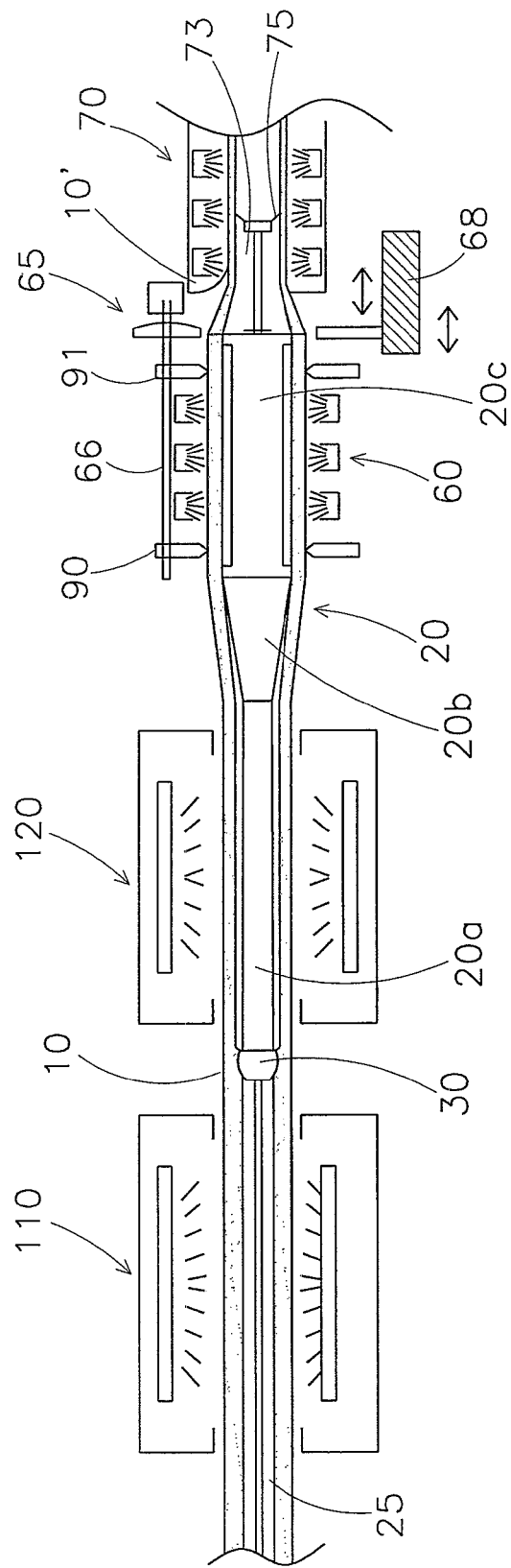
Figure 1C:
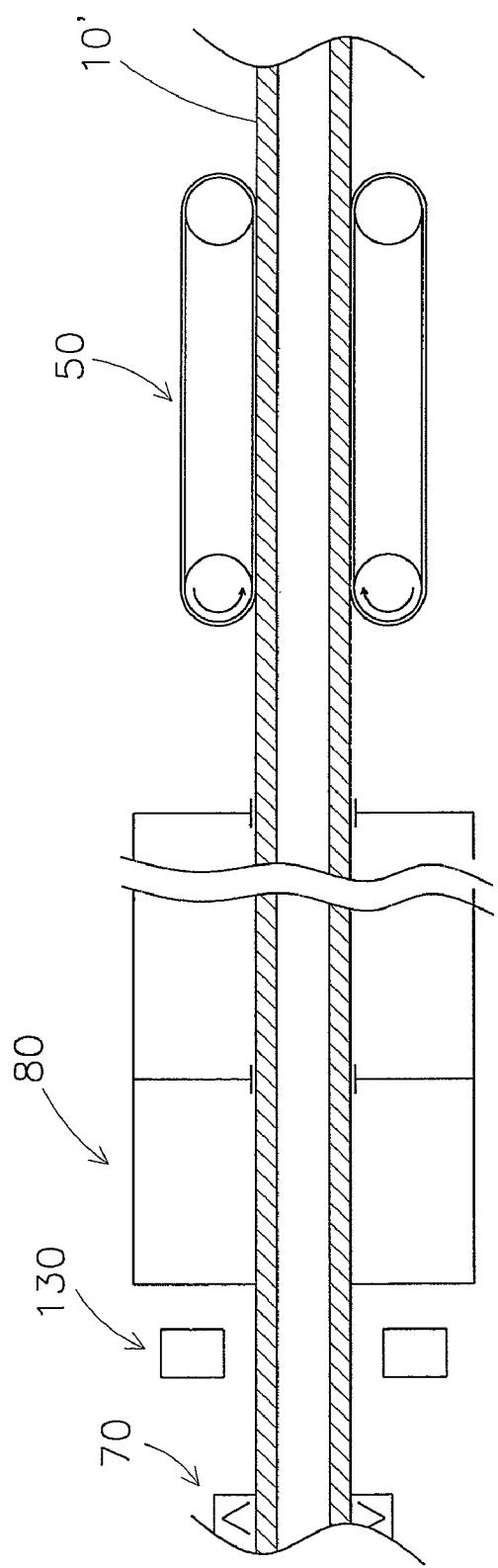

FIGS. 1a, 1b and 1c are not to scale and schematically show consecutive portions of an example of an installation for producing biaxially oriented thermoplastic tubing. The installation is shown to elucidate all aspects of the present invention, some aspect not being shown in detail, or being elucidated by assuming substitution of a part of this installation for another part, e.g., as explained with reference to FIGS. 5 and 6.

The installation comprises an extruder 1 having one or more extruder screws 2 by means of which a flow of thermoplastic material is provided, e.g., of polyvinylchloride (PVC).

The thermoplastic material is fed to a die head 3 arranged on the extruder 1. The die head 3 has an outer body 4 and an inner die member 5, which together with the outer body 4 defines an annular passage from which an extruded tube in preform condition 10 of thermoplastic material emerges, as is preferred in a substantially horizontal direction. The inner die member 5 forms a lumen or axial inner cavity in the tube in preform condition 10. As is common in this technology, after a rather thick walled tube in preform condition 10 is extruded, the wall thickness later is reduced and the diameter is increased by the biaxial orientation process.

In an alternative embodiment the die head 3 is an offset die head 3 with an inlet for the extruded material at a lateral side of the die head and with a central axial passage through the die head 3, essentially through the inner die member 5.

Preferably the die head 3 is provided with means for controlling and adjusting the annular passage in order to control the wall thickness and/or cross-sectional shape of the tube in preform condition 10 emerging from the die head 3. This type of die head 3 is known in the art. Preferably an appropriate measuring device 6 is arranged directly downstream of the die head 3 and measures the emerging tube in preform condition 10 to provide control signals for the die head 3.

As is preferred an external cooling device 8 is arranged downstream of the extruder 1 and the die head 5 to cool and temper the thick walled tube in preform condition 10, e.g., from about 200° C. to about 100° C. for PVC. The external cooling device 8 may e.g., comprise a number of compartments behind one another through which cooling water is circulated, the tube in preform condition 10 being in direct contact with the cooling water in each compartment. The temperature of the cooling water may vary from one compartment to another. If desired, it can be arranged that the cooling water circulation in each compartment may be switched on or off.

An outer diameter calibrating device 8a may be provided at the upstream end of the external cooling device 8.

Downstream of the external cooling device 8 a first drawing device 15, which may also be referred to as a preform speed-control device, is arranged. Preferably the device 15 includes multiple tracks engaging on the exterior of the tube in preform condition 10, the speed of the tracks being controlled by a suitable track drive system. Such drawing devices 15 are customary in plastic pipe extrusion.

In an embodiment not shown here an external heating device for the tube in preform condition is arranged between the external cooling device 8 and the first drawing device 15, the heating device being adapted to heat in an adjustable manner one sector of the circumference of the tube 10, or possibly multiple selected sectors of the circumference of the tube 10, e.g., only a bottom section of the tube 10 and not the remainder of the circumference of the tube 10, prior to reaching the first drawing device 15. It has been found that heating only a bottom section of the tube 10 at this position is beneficial for the uniformity of the wall thickness of the finally obtained tube. This external heating device could comprise one or more infrared heating elements.

The FIG. 1b further schematically depicts an expansion device 20. The expansion device 20 is held in place by means of an anchoring rod 21 that is at one end fastened to the expansion device 20. The anchoring rod 21 is connected to the die head 3.

As is preferred a force sensing assembly 22 is provided to measure the pull force on the anchoring rod 21 during operation of the installation.

As is preferred the anchoring rod 21 has one or more internal ducts, e.g., for supply and discharge of fluid; liquid and/or gas (e.g., air); to locations within the lumen of the tube and/or the expansion device 20. Also the anchoring rod 21 may include one or more ducts for electrical wiring, e.g., to connect to one or more sensors (e.g., pressure and/or temperature) in the lumen of the tube and/or the expansion device, or e.g., to control one or more valves or other electronic components, possibly housed within or at the downstream end of the expansion device.

In general the expansion device 20 shown here includes—from upstream to downstream end thereof—a run-on part 20a, an expansion part 20b, and a run-off part 20c. The expansion part 20b—as is preferred—has at least one non-deformable or rigid portion with a gradually increasing diameter in downstream direction, e.g., of conical shape, e.g., with the outer surface of a truncated cone, so as to come into contact with the tube 10 and to exert an expanding force on the tube 10 that brings about diametrical expansion of the tube 10. The expansion part 20b has a maximum diameter at its downstream end, the run-off part 20c here has a diameter that does not exceed the maximum diameter, in fact is preferably less over a reduced diameter section as will be explained below.

The expansion part 20b and as is preferred also the run-on part 20a and the run-off part 20c here are of rigid, non-deformable embodiment.

The run-on part 20a here is of an elongated, generally cylindrical design. The diameter of the run-on part 20a substantially corresponds to the diameter of the lumen within the preform 10 upstream of the expansion device 20. The run-off part 20c here is of a generally cylindrical design.

Preferred details of the expansion device 20 or parts thereof will be explained further below.

At a distance downstream of the expansion device 20, as is common in this technology, a further drawing device 50 is arranged. This drawing device 50 is adapted to exert a considerable tensile force on the oriented tube 10. In general the passage of the suitably tempered tube 10 over the expansion device 20 under the influence of the tensile force exerted by the drawing device 50 causes the tube 10 to be expanded in diameter as well as stretched in a considerable manner in axial direction, the wall thickness being significantly reduced in the process so that an biaxially oriented tube 10 is obtained. The maximum diameter of the expansion part 20b in this example basically dictates the orientation in circumferential to which the tube in preform condition is subjected.

As is preferred an external cooling of the oriented tube 20 is effected soon after the diametrical expansion of the tube 10 has been brought about, preferably—as here—whilst the tube 10 passes over the run-off part 20c, most preferably starting close to, yet not on, the expansion part 20b. For this reason a first external cooling device 60 is provided. This first cooling device 60 preferably includes one or more nozzles spraying or jetting cooling water onto the exterior surface of the oriented tube, preferably with a significant cooling capacity to arrive at an intense external cooling. Other preferred details will be explained below.

As is preferred at least one further or second external cooling device 70 is arranged at a relatively short distance downstream of the expansion device 20. This second external cooling device 70 preferably includes one or more nozzles spraying or jetting cooling water onto the oriented tube 10.

As is preferred yet another or third external cooling device 80, preferably embodied with one or more compartments as described with reference to cooling device 8, is arranged downstream of the device 70 and upstream of the drawing device 50 to cool the oriented tube 10 to a final, e.g., ambient, temperature.

Downstream of the drawing device 50 the oriented tube 10 may e.g., be cut to individual tube elements with e.g., a sawing, cutting or milling device or the tube, when appropriate may be spooled onto a reel. This equipment is known in the art.

It is envisaged, in an exemplary embodiment, that no calibration of the outer diameter of the biaxially oriented tube by passing the tube through a sizing opening of a calibration device is effected downstream of the expansion device 20. This is considered to avoid a loss of strength of the finally obtained tube due to the impact of the sizing device on the tube.

Here, use is made of an expansion device 20 with a run-on part 20a that is provided with a sealing member 30 that is sealingly engaged by the tube in preform condition 10. The sealing member 30 is arranged at a distance upstream of the expansion part 20b of the expansion device 20. As is preferred the sealing member 30 is arranged at or in the close vicinity of the nose-end of the run-on part 20a.

As is preferred, there is no external part of the installation at the height of the sealing member 30 that presses the tube in preform condition 10 onto the sealing member 30 as this would cause a risk of damaging the tube in preform condition, of disturbing the expansion and also entail a risk of seizing of the tube in preform condition between the sealing member 30 and any external part.

This sealing member 30 and the sealing engagement thereof with the tube in preform condition 10 during the production process is advantageous as it provides a barrier between the zone upstream of the sealing member 30 and the zone downstream of the sealing member 30 within the lumen of the tube in preform condition 10, so that conditions and/or actions can be performed in the zones that are fully or at least largely independent from one another.

As is advantageous for temperature conditioning of the tube in preform condition 10 a liquid circulation compartment 25 is formed in the lumen of the tube in preform condition 10 between a closing member 26 at a distance upstream from the nose end of the run-on part 20a on the one hand and the sealing member 30 on the other hand. A liquid of controlled temperature, e.g., water, is circulated through the liquid circulation compartment in direct contact with the inside of the tube in preform condition 10. This allows establishing an effective internal temperature conditioning of the tube in preform condition directly upstream of the expansion device. In practice the internal temperature condition may be affected with hot water, e.g., close to the orientation temperature, e.g., close to the boiling temperature of water when producing biaxially oriented PVC tubing.

The closing member 26 may be arranged on the anchoring rod 21, but here is arranged on the inner member 5 of the die head 3. By choosing the location of the closing member 26 the effective length of the compartment 25 can be established.

The water to be circulated through the compartment 25 is supplied from a water source, preferably including a pump and a water heater, via one or more ducts in the rod 21. The return flow of water leaving the compartment 25 is discharged via one or more other ducts in the rod 21.

Here, use is made of an expansion device 20 having one or more fluid supply ducts 27 (a portion of which is schematically depicted) to form a fluid volume between the expansion device 20 and the tube 10. The fluid may be water, but another liquid or a gas, e.g., compressed air, may also be used as fluid. The use of a gas will avoid any problems associated with the presence of water residue on the inside of the tube downstream of the expansion device. When water or another liquid is used—if desired—provision can be made for a removal of any leaking water downstream of the expansion device 20, e.g., by providing a further compartment 73 within the lumen of the oriented tube 10 that is closed at its end by a closure member 75 and providing a suction means to remove any water.

Figure 2:
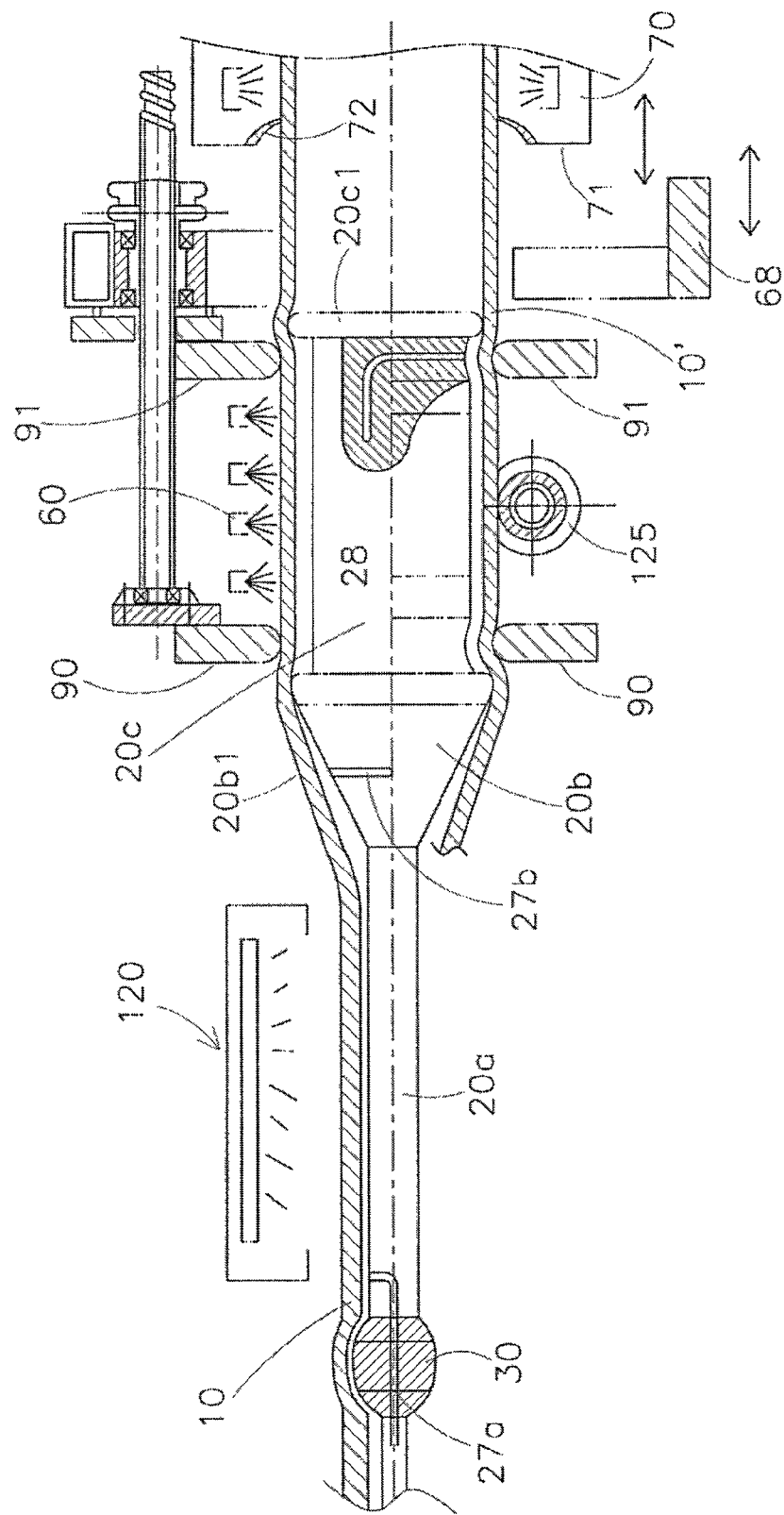
FIG. 2 shows schematically in longitudinal section a part of the installation of FIGS. 1a, b, and c.
Figure 3:
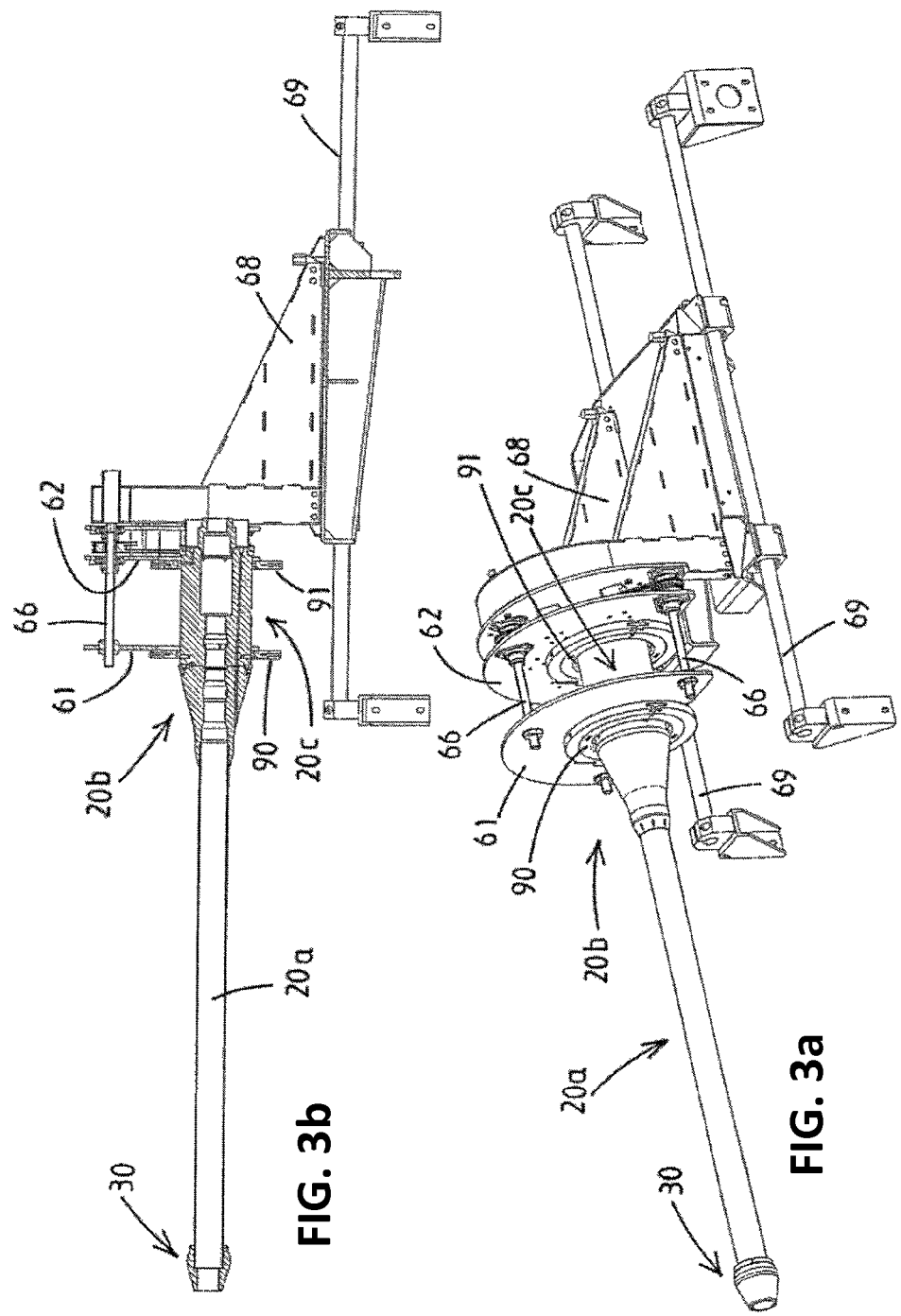
FIGS. 3a and 3b show schematically in perspective view and in longitudinal section components of the part of the installation of FIG. 2.

It is noted that in FIG. 2 the presence of a water film between the run-on part 20a and the upstream portion of the expansion part 20b on the one hand and the tube 10 on the other hand is suggested. However the thickness of the water film relative to the wall thickness of the tube in preform condition and the diameter of the expansion device is exaggerated.

The one or more supply ducts 27a here have a port in the outer surface of the run-on part 20a and/or the expansion part 20b of the expansion device. Possibly fluid is supplied between the tube and the expansion device directly downstream of the sealing member 30.

In this example a discharge duct 27b is provided to discharge the water being entrained with the moving tube 10.

As is preferred the first or upstream fluid volume is established over the entire length of the run-on part 20a downstream of the sealing member 30, more preferably also over the upstream portion of the expansion part 20b. Also a second or downstream fluid volume is preferably formed over at least a portion of the run-off part 20c, preferably a sealing engagement of the tube with the expansion device in a region at or near the maximum diameter of the expansion part forming a barrier with an upstream fluid volume.

The first or upstream fluid volume, in conjunction with the presence of the sealing member 30, allows to have a relatively long run-on part which is beneficial for the stability of the tube 10 when leading up to the expansion part, the fluid preventing any or at least any excessive frictional contact between the tube in preform condition and the run-on part, more preferably as the contact is concentrated solely on the sealing member 30.

In a practical embodiment the sealing member 30 could have a diameter that is between 4 and 20 millimeters greater than the diameter of the downstream located portion of the run-on section.

The sealing member 30 forms an effective and reliable seal that prevents the fluid, which is supplied at an elevated pressure that is sufficient for the formation of a fluid volume, from reaching the lumen of the tube in preform condition 10 upstream of the sealing member 30. When the production is performed with the presence of compartment 25, and with— as is preferred—a relatively low pressure of the water in the compartment, it is understandable that the fluid will try to reach the lower pressure zone upstream, the sealing member reliably avoiding this effect. This allows for a stable fluid volume between the expansion device, preferably both the run-on part and the expansion part, and the tube, as any escape of fluid to upstream of the sealing member 30 will cause a pressure drop in the volume and thus instability.

As mentioned the fluid is in a practical embodiment a liquid, more preferably when the fluid is used to form a relatively thin layer, which has a primary purpose to serve as a lubricant between the tube and the expansion device. Possibly water is used as fluid, preferably non-boiling heated water, wherein a water heater and pump are used to provide and supply the heated water via one or more ducts in the rod 21 at a suitable pressure to the expansion device 20. The pressure is chosen so as to allow the formation of a liquid film between the expansion device and the tube.

In another embodiment the fluid is a gas, e.g., air, supplied via a compressor or other pressurized gas source to be introduced between the expansion device and the tube. This is preferred in particular when the expansion of the tube is to be caused, at least partly, by the internal fluid pressure caused by the gas.

As can be seen in the drawings—and as is preferred—use is made of at least one external heat exchange device 110 that is adapted to influence the temperature of the tube in preform condition 10 arriving at the sealing member 30, and thereby the sealing contact between the tube in preform condition 10 and the sealing member 30. As is preferred at least one such heat exchange device is an external heat exchange device that is arranged between the drawing device 15 and the location of the sealing member 30 to influence the temperature of the tube in preform condition 10 from the exterior thereof. Preferably the device, here device 110, is arranged directly upstream of the sealing member location.

As is preferred a second external heating device 120 here is arranged downstream of the sealing member 30 location, between the sealing member 30 and the expansion part of the expansion device or even overlapping (a part of) the expansion part of the expansion device 20.

In an arrangement with a first external heating device 110 directly upstream of the sealing member location and a second external heating device 120 downstream of the sealing member location, each heating device 110, 120 being controllable independently, the first heating device 110 can be used primarily for controlling the sealing engagement with the sealing member 30, and the second heating device 120 in order to influence the tube 10 directly upstream of and/or during the passage of the tube over the expansion part of the expansion device. The heating devices 110, 120 may each include multiple heating elements distributed around the path of the tube, e.g., multiple infrared heating elements.

A control device, e.g., electronic, preferably is provided to control the operation of each external heating device 110, 120. For the external heating device 110 the control may be based on a feedback signal representative of the actual sealing engagement of the tube in preform condition 10 with the sealing member 30, e.g., obtained via a force monitoring device that is adapted to monitor the axial force on the sealing member 30 (e.g., with a strain gauge) or obtained via a monitoring device that is adapted to monitor a local deformation in the moving tube caused by the sealing member 30, e.g., a local bulging of the tube as indicated in FIG. 2, e.g., by measuring the diameter of the preform upstream, at, and downstream of the sealing member.

The sealing member 30 is a member 30 having a diameter that is larger than the downstream portion of the run-on part 20a. As is preferred the run-on part 20a has a uniform diameter between the sealing member 30 and the expansion part 20b.

As is preferred the sealing member 30 is a separately manufactured annular member fitted on a tubular member of the run-on part.

As is preferred the sealing member 30 is a metallic member with no provision to supply a lubricant to the outer surface thereof. In more complex embodiments however the sealing member may be adapted to control the frictional engagement thereof with the tube in preform condition, e.g., provided with a lubrication device, e.g., allowing a gas, e.g., air, to be fed between the sealing portion and the tube in preform condition. In another embodiment the sealing member may be construed to have a variable diameter and an associated control means, e.g., with an outer metallic skin that is expandable under hydraulic pressure, so as to control the sealing engagement with the tube in preform condition.

Figure 4:
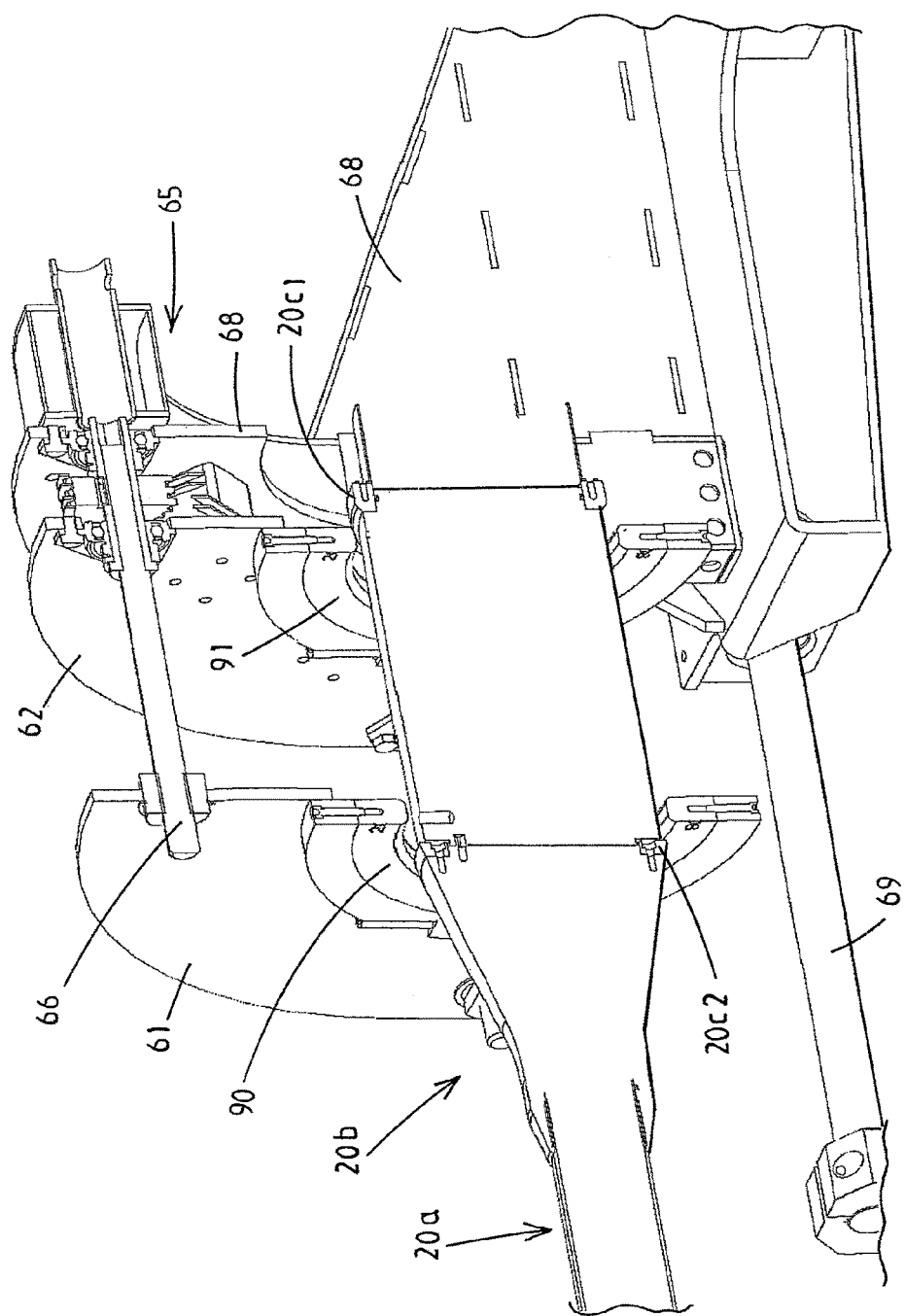
FIG. 4 shows schematically in longitudinal section a portion of the components of FIG. 3.

According to another aspect of the present invention the run-off part 20c, which is downstream of the expansion part 20b, has a reduced diameter section having a smaller diameter than the maximum diameter of the expansion part 20a. Possibly the reduced diameter section directly adjoins the maximum diameter cross-section, so that a diameter reduction step occurs directly behind the maximum diameter position. This can be clearly seen in FIGS. 2 and 4.

Use is made here of at least one outer diameter ring member, here—as preferred—two ring members 90, 91, through which the tube 10 passes at the location of the run-off part of the expansion device, here at the location of the reduced diameter section of the run-off part 20c. As is preferred the ring members 90, 91 here are each embodied as a constrictive outer diameter ring member, which means that each ring member 90, 91 exerts a radial constrictive force on the tube 10 passing there through, thereby reducing the outer diameter of the tube 10, at least over a short axial distance. In practice this means that the opening within each ring member 90, 91 has a diameter which is less than the projected outer diameter of the oriented tube 10 at the location during the normal production process.

The reduced diameter section here is dimensioned so as to avoid a problem of seizing of the tube between the expansion device 20 and the at least one outer diameter calibrating ring 90, 91.

The reduced diameter section preferably has a diameter that is at least 4 millimeters less than the maximum diameter of the expansion part 20b of the expansion device 20.

Preferably the diameter reduction is about twice the wall thickness of the tube passing over the section.

By providing the reduced diameter section the outer diameter ring members 90, 91 can be arranged around the reduced diameter section, with the radial spacing between the ring members 90, 91 and the reduced diameter section being more than the wall thickness of the tube 10 desired during the production process at the location, so that some radial play remains that allows for possible variations in the wall thickness of the tube during the production process, without the risk that the tube becomes stuck between a ring member 90, 91 and the reduced diameter section of the run-off part of the expansion device.

Each ring member 90, 91 may be provided with cooling means for cooling the ring member 90, 91, e.g., with an internal cooling fluid duct, e.g., an annular duct.

Each ring member 90, 91 preferably is composed of two semi-circular parts, allowing to place the ring members 90, 91 around the tube 10, e.g., during the start-up phase of the production process, and allowing to remove, e.g., for exchange, the ring members during the production process.

Each ring member 90, 91 preferably is made of metal.

As indicated above, in order to freeze the orientation of the plastic material, the oriented tube is cooled externally while passing over the run-off part 20c by the first external cooling device 60.

The external cooling by first external cooling device 60 of the tube while passing over the run-off section 20c is here performed in the absence of internal cooling of the tube 10 while passing over the expansion device 20, and in fact also in the absence of any internal cooling downstream of the expansion device 20.

In order to arrive at a biaxially oriented tube 10 with desired dimensions, as wall thickness and cross-sectional shape, preferably without using an outer diameter calibration downstream of the expansion device 20, it has been found possible to rely on the use of the one or more outer diameter ring members 90, 91 and/or the external cooling of the oriented tube. This is done on the basis of the so-called snap-back effect. This snap-back effect is known in the art and is visible as a reduction of the tube diameter directly downstream of the expansion device 20.

In an exemplary embodiment the first external cooling device 60 is adapted to adjust the length and/or location with respect to the expansion device 20 of the stretch of the oriented tube 10 that is affected by the first external cooling device 60. It has been found that by suitable selection of the length, and preferably also the location, of the affected stretch with respect to the expansion device, in particular the run-off part 20c, the snap-back effect can be controlled, and so the diameter of the tube 10. Clearly the intensity of the cooling by device 60 can also be controlled and will have an influence on the snap-back effect.

In a very practical embodiment the first external cooling device 60 operates with one or more nozzles emitting sprays or jets of cooling liquid, e.g., water, and comprises an upstream shield member 61 and a downstream shield member 62, the shield members 61, 62 delimiting the stretch of oriented tube that is affected by the sprays or jets of cooling liquid. At least one of the shield members, preferably both, is displaceable in axial direction, thereby allowing adjusting the length and/or the location of the stretch of tube that is affected by the cooling liquid. It will be appreciated that by controlling the length and/or position of the shield members, the cooling of the oriented tube can be controlled, even more when—as is common—the intensity of the cooling spray can be controlled as well.

In an even more practical embodiment each of the shield members 60, 61—as depicted here—is integral with a ring member 91, 92.

A displacement device 65, here embodied as motorized drive assembly, for axial displacement of at least one of the shield members 61, 61 and/or at least one of the ring members 90, 91 in axial direction along the run-off part 20a is provided. In this example the device 65 includes one or more screw spindles 66, e.g., operated by a common electric motor.

As is preferred the ring members 90,91 and shield members 61, 62, as well as the associated displacement device 65, are mounted on a mobile support 68 (here with axial linear guides 69) allowing to displace the components in axial direction, e.g., to a retracted position downstream of the position of the expansion device 20, e.g., in order to allow access to the expansion device e.g., when replacing the expansion device and/or during start-up of the installation.

As is preferred a second external cooling device 70 is arranged spaced downstream from the first external cooling device 60 and the expansion device 20. The second external cooling device 70 preferably comprises one or more nozzles emitting sprays or jets of cooling water onto the exterior of the oriented tube 10.

Preferably a dry zone is created between the external cooling devices 60 and 70 on the outside of the tube 10. This is considered to avoid or at least reduce the formation of visual effects, e.g., rings, on the outside of the tube by cooling water.

Preferably the second external cooling device 70 comprises an upstream shield member 71 delimiting the upstream end of the stretch of oriented tubing 10 affected by the external cooling device 70. As is preferred the upstream shield member 71 is movable in axial direction by an associated displacement device, or is coupled to an axially mobile ring member 91 or shield member 62.

The upstream shield member 71 preferably has an easily flexible annular lip 72 engaging the oriented tube 10 so as to avoid any scratching or deformation of the oriented tube.

Here use is made of a measuring device 130 for measuring at least the outer diameter of the oriented tube 10, and preferably also the wall thickness and/or cross-sectional profile, which measuring device 130 is arranged downstream of the expansion device 20, here downstream of the second external cooling device 70.

Also use is made of a control device (not shown), e.g., an electronic device, which is linked to the measuring device in order to obtain input signals that allow to control the first external cooling device 60 and/or the second external cooling device 70. For instance the device 60 is controlled with regard to at least the length and/or location with respect to the expansion device of the stretch of oriented tube that is affected by the first external cooling device 60, and/or the intensity of the cooling. For instance the second external cooling device 70 is controlled with regard to the axial position of the upstream shield member 71 and/or the intensity of the cooling. By control of the external cooling of the tube by the cooling device 60 and/or device 70 the snap-back effect can be controlled, and thus the diameter of the finally obtained tube. This can then be done without the need for any further outer diameter calibration downstream of the expansion device.

In a practical embodiment this control device is adapted such that the length of the stretch of tube that is affected by the first external cooling device 60 is decreased to obtain an increased snap-back effect and thus increased diameter reduction, and wherein the length is increased to obtain a reduced snap-back effect and thus decreased diameter reduction. In a practical embodiment the axial position of the upstream shield member of the second external cooling device 70 is chosen or adjusted to be in the region where the snap-back effect occurs.

As is preferred provisions are made for the presence of a first or upstream fluid volume upstream of the maximum diameter of the expansion part of the expansion device and a second or downstream fluid volume between the reduced diameter section of the run-off part 20c of the expansion device and the oriented tube 10.

In order to supply fluid, e.g., water, preferably gas, more preferably air, most preferably heated, to the second fluid volume, one or more dedicated supply ducts can be provided having a port in the run-off part exterior surface. As an alternative, or in combination therewith, a communication passage can be made, preferably a valve controlled passage, which communicates with both the first and the second fluid volume. Such a passage allows e.g., to equalize the pressure in the two fluid volumes when desired and/or to introduce fluid into one volume via a supply duct having a port at the other volume. While not depicted here, the skilled person will appreciate that the passage could extent between ports in the outer surface of the expansion device, e.g., on at the run-on part and one at the run-off part, with interposition of a valve, e.g., an electrically operated valve, e.g., mounted at the rear end of the expansion device.

The presence of two outer diameter ring members 90, 91 spaced apart from one another is advantageous, even more advantageous when the run-off part 20c is embodied with an increased diameter portion 20c1 delimiting the downstream end of the reduced diameter section. Preferably each ring member 90, 91 being mobile in axial direction relative to the reduced diameter section.

With the ring members 90, 91 both suitably dimensioned as constrictive ring members, the effect can be obtained that the ring member 90 contributes to the sealing engagement of the tube with the expansion device in the region at or near the maximum diameter of the expansion part 20b. This avoids uncontrolled escape or leakage of fluid from the one volume to the other volume.

The ring member 91 contributes to the sealing engagement of the oriented tube with the increased diameter portion 20c1. This avoids or at least limits any leakage of fluid into the lumen of the oriented tube downstream of the expansion device 20, and thus avoids undesirable instability of the fluid volume. Most preferably the downstream ring member 91 is located closely upstream of the increased diameter portion 20c1, thereby enhancing the sealing contact between the tube and the increased diameter portion 20c1.

Possibly the expansion device 20 has one or more discharge ducts 28 for the fluid, e.g., with a port near the downstream end of the reduced diameter section of the run-off part 20c, which is advantageous when use is made of a liquid that is entrained with the tube 10 from an upstream port of a supply duct to the discharge duct port.

In an exemplary embodiment the installation is provided with both supply means for a liquid fluid to one or both fluid volumes between the expansion device and the tube and supply means for gaseous fluid to one or both fluid volumes, and with an arrangement of ducts and one or more valves allowing to selectively feed fluid to one or both fluid volumes. For instance in a start-up phase fluid is only fed to the first volume, e.g., first heated water and later gas, such as air. The ring members 90, 91 may be absent during the start-up phase, facilitating the first passage over the run-off part. Later the ring members 90, 91 are fitted or made operative and a fluid is fed to the second volume, e.g., heated air.

The excellent sealing engagement in the region of the maximum diameter of the expansion part, also allows for a reliable operation with the first fluid volume not being a film to prevent friction, but an internal pressurized zone within the tube that causes gradual expansion of the tube to an internal diameter less than the maximum diameter in order to maintain the reliable sealing engagement. The use of an internal pressurized zone to cause gradual expansion in a production process for biaxially oriented thermoplastic tubing is known in the art, e.g., from WO 90/02644. However in the known installations operating according to this approach use is made of an inflatable plug to delimit the downstream end of the pressurized zone, which inflatable plug presses the expanded tube against a surrounding sizing sleeve to obtain a seal that avoids pressure loss in the pressurized zone. This approach has shown to come up with less favorable results, e.g., with regard to uniformity of dimensions of the finally obtained tube and stability of the production process. One aspect is e.g., that the inflatable plug is deformable, and thus does not dictate the obtained orientation in the manner as the non-deformable expansion part.

In the embodiment depicted here the expansion part of the expansion device 20 has a stepped design with a first conical surface increasing in diameter in downstream direction, adjoining a cylindrical surface of a first diameter, followed by a second conical expansion surface increasing in diameter in downstream direction. As is preferred the diameter of the sealing member 30 is greater than the first diameter of the expansion part in this stepped design. The expansion part could have multiple steps.

In an embodiment one or more rollers 125 are arranged below tube 10 so as to support the tube, e.g., below the run-off part of the expansion device or, with preference, downstream of the expansion device e.g., to avoid interference with any of the rings 90, 91.

In this practical embodiment an upstream replaceable ring 20b1 is fitted at the transition between the expansion part 20b and the run-off part 20c of the expansion device, the replaceable ring 20b1 forming the maximum diameter of the expansion part 20b. This allows for relatively easy change of the maximum diameter of the expansion device as well as replacement of ring in case of wear.

In this practical embodiment the increased diameter portion 20c1 is formed by a downstream replaceable ring which is fitted at the downstream end of the run-off section, the replaceable ring having a diameter greater than the upstream portion of the run-off part of the expansion device. This allows for relatively easy change of the diameter of the expansion device at the downstream location as well as replacement of the zone in case of wear.

Figure 5:
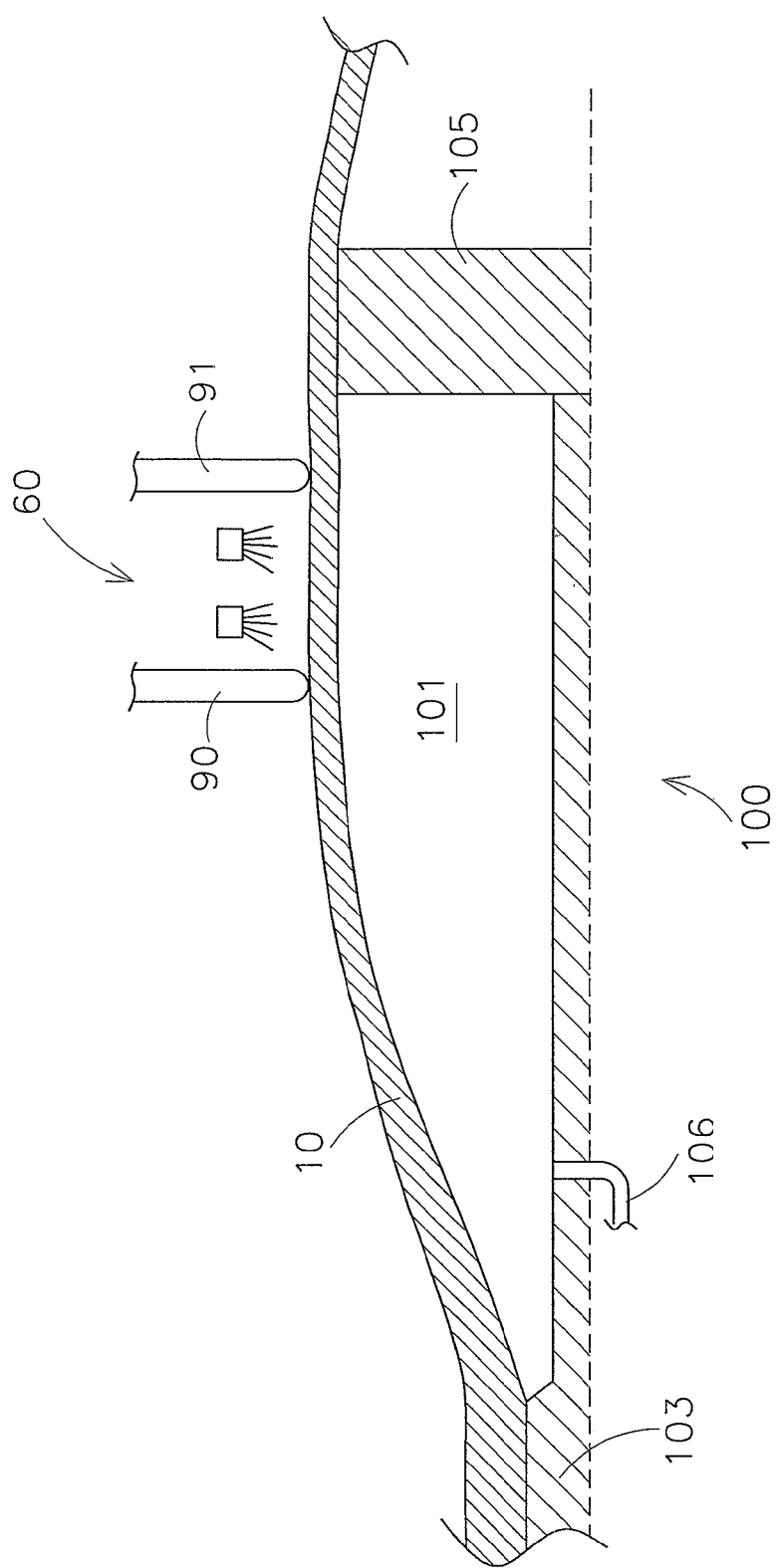
FIG. 5 shows schematically in longitudinal section a portion of an installation for producing biaxially oriented thermoplastic tubing according to aspects of the invention.

FIG. 5 shows schematically in longitudinal section a portion of an installation for producing biaxially oriented thermoplastic tubing according to many aspects of the invention.

FIG. 5 shows the portion wherein the thermoplastic tube is passing over the expansion device 100. This expansion device 100 may e.g., be integrated in the installation that is described with reference to FIGS. 1a, 1b, and 1c, or in an installation including at least an extruder, one or more tempering devices for the tube in preform condition, a drawing device downstream of the expansion device as well as a cooling device for the oriented tube. When seen in conjunction with FIGS. 1*a-c* the expansion device 100 depicted in FIG. 5 then replaces the expansion device 20.

As is preferred in combination with the expansion device 100 a first external cooling device 60 is used, here, as preferred, having one or more features of the external cooling device 60 as has been discussed herein before. As is preferred a second external cooling device, preferably having one or more of the features of external cooling device 70, is arranged downstream of the expansion device 100. It will be appreciated that a control device for these first and/or second external cooling device, preferably having one or more of the features of the control device as discussed herein before, is also present.

By suitable control of the first and/or second external cooling device the snap-back effect, that occurs at a short distance downstream of the expansion device can be controlled, and thereby the diameter of the oriented tube, this without—as is preferred—making use of any external diameter calibrating device downstream of the expansion device.

The expansion device 100 is embodied to cause expansion of the tube from the preform condition into a biaxially oriented tube based on internal fluid pressure in a relative large fluid volume 101 inside the lumen of the tube between the tube and the expansion device. The expansion device 100 here includes an upstream sealing portion 103 that fits sealingly into the yet unexpanded tube in preform condition, e.g., the sealing portion having one or more of the features of the sealing member 30. The upstream sealing portion 103 delimits the volume 101 at its upstream end.

The expansion device 100 also includes a downstream sealing portion 105 that fits sealingly in the expanded tube 10 and delimits the fluid volume 101 at its downstream end. As is preferred the sealing portion 105 is non-deformable, e.g., of a metal.

The expansion device 100 includes one or more fluid supply ducts 106 that allow introducing fluid, e.g., pressurized gas, e.g., air, into the fluid volume 101.

The FIG. 5 shows the presence of a downstream outer diameter ring member 91 that is arranged a short distance upstream of the downstream sealing portion 105. The ring member 91 exerts a constrictive force on the tube, thereby contributing to the sealing engagement between the tube and the sealing portion 105. As is highly preferred, there is no part of the installation at the same axial location as the portion 105 that contacts the tube on the exterior so as to press it against the sealing portion 105. This avoids any risk of seizing of the tube between such a part of the installation and the sealing portion 105, as well as prevents undesirable damage to the tube.

As is preferred a further, upstream outer diameter ring member 90 is arranged at a distance upstream of the ring member 91. As will be appreciated the ring members 90, 91 are preferably integrated with shield members of the first external cooling device 60.

The cooling by first external cooling device 60 also contributes somewhat to the sealing engagement between the tube 10 and the portion 105. However its main purpose is to freeze the biaxial orientation, as well as to control the snap-back effect, as is preferred in combination with the use of the second external cooling device 70.

Figure 6:
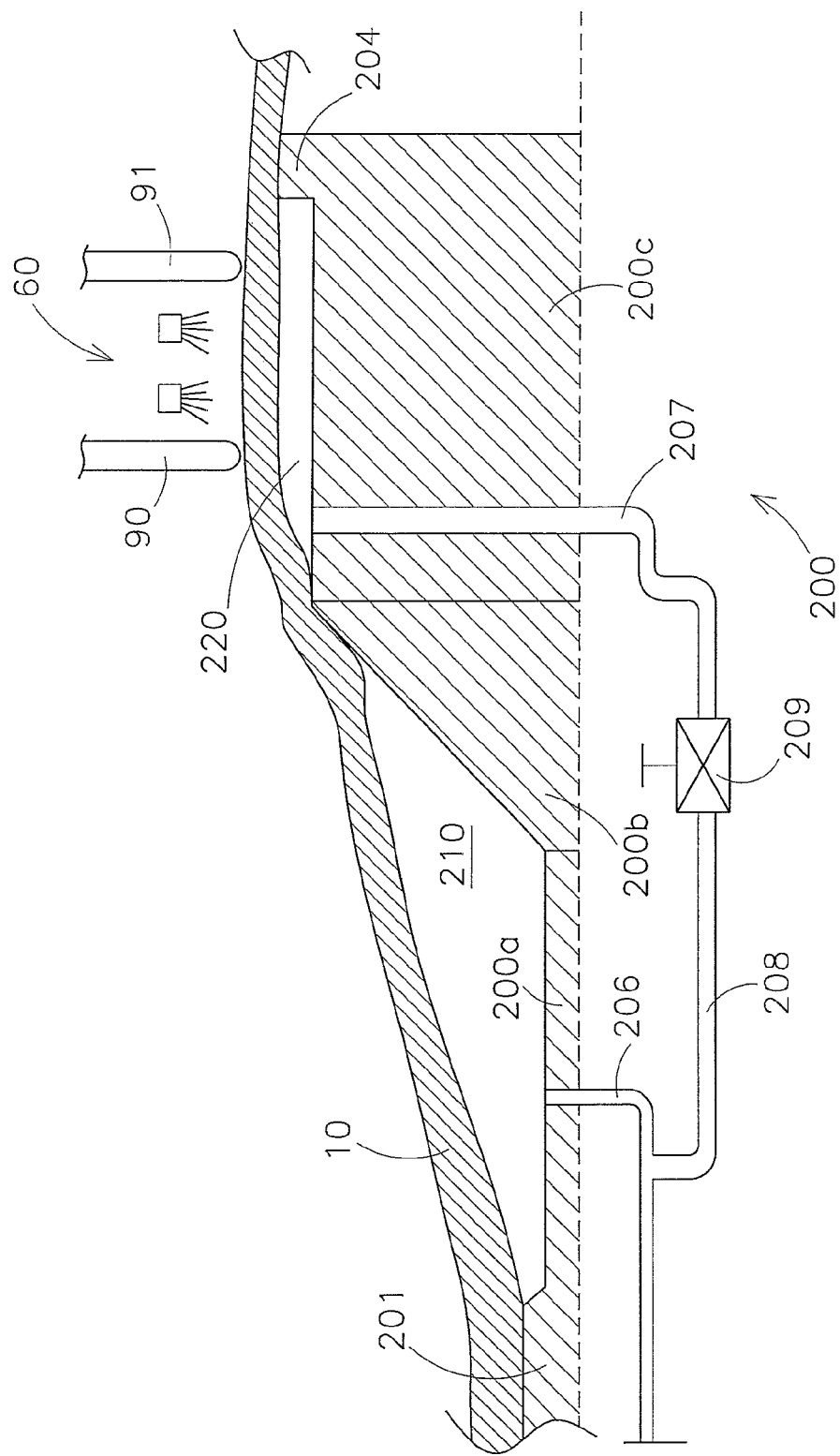
FIG. 6 shows schematically in longitudinal section a portion of an installation for producing biaxially oriented thermoplastic tubing according to multiple aspects of the invention.

FIG. 6 shows schematically in longitudinal section a portion of an installation for producing biaxially oriented thermoplastic tubing. The FIG. 6 is used to elucidate yet another aspect of the invention.

FIG. 6 shows the portion wherein the thermoplastic tube is passing over the expansion device 200. This expansion device 200 may e.g., be integrated in the installation that is described with reference to FIGS. 1*a*, 1*b*, and 1*c*, or in an installation including at least an extruder, one or more tempering devices for the tube in preform condition, a drawing device downstream of the expansion device as well as a cooling device for the oriented tube. When seen in conjunction with FIGS. 1*a-c* the expansion device 200 depicted in FIG. 5 then replaces the expansion device 20.

The expansion device 200 is embodied to effect expansion of the tube by a hybrid process of expansion by internal fluid pressure and expansion caused by contact with a non-deformable expansion part of the device 200

In this example the expansion device includes a run-on part 200*a* including a sealing portion 201 that sealing engages the non-expanded tube in preform condition. Downstream thereof, spaced from the sealing portion 201, the expansion device 200 has a non-deformable expansion portion 200*b* with a gradually increasing diameter to a maximum diameter.

Downstream of the portion 200*b* the expansion device 200 includes a run-off part 200*c*, here with an increased diameter portion also acting as downstream sealing portion 204.

An upstream or first fluid volume 210 is present between the upstream sealing portion 201 and the location of contact of the tube with the expansion part 200*b*. This fluid volume 210 is filled with a pressurized fluid, preferably a gas; here air, via supply duct 206 so as to affect gradual expansion of the tube due to internal fluid pressure. This expansion is such that the tube 10 is expanded from its preform condition to a diameter such that the tube 10 still contacts the conical face of expansion part 200*b* during normal production of the biaxially oriented tube. This contact causes a further expansion of the tube 10 due to the forces exerted by the expansion part 200*b* on the tube. As can be seen the tube now sealingly engages the expansion device in the region at or near the maximum diameter of the expansion part 200*b*.

A downstream or second fluid volume 220 is present between the location of contact between the tube at or near the maximum diameter of the expansion part 200*b* on the one hand, and the location of contact between the tube and the downstream sealing portion 204 on the other hand.

This fluid volume 220 is filled with a pressurized fluid, preferably a gas; here gas, via supply duct 207 so as to affect gradual expansion of the tube due to internal fluid pressure. So a further expansion is affected by the fluid pressure, generally to expand the tube so that it can pass over the sealing portion 204 which has a greater diameter than the maximum diameter of the expansion part 202.

As is preferred a communication passage 208 with a control valve 209 is provided in the fluid supply device, here schematically shown, allowing to bring the fluid volumes 210 and 220 in communication, thus allowing to equalize the pressure in both volumes on command. As shown here the supply duct 207 is placed in series with the passage 208, however the supply duct could also be a distinct supply duct, the passage 208 forming a controllable connection between the duct 206 and the duct 207.

As is preferred a downstream outer diameter ring member 91 is provided, preferably such that the ring member 91 contributes to the sealing engagement of the tube with the sealing portion 204. Further preferred details of the ring member 91 have been disclosed herein before and may be used in combination with the expansion device 200.

As is preferred an upstream outer diameter ring member 90 is also provided, the ring member 90 being arranged downstream of the maximum diameter of the expansion portion 202.

As is preferred a first external cooling device 60 is employed for cooling the tube when the tube passes between the expansion part and the downstream sealing portion 204. As is preferred the first external cooling device includes one or more of the features of the cooling device described herein.

As is preferred the one or more ring members 90, 91 are integrated with one or more shield members of the first external cooling device 60.

When desired the downstream sealing portion 204 can be embodied with a gradually increasing diameter and the tube contacting the face of the sealing portion in a manner that a further circumferential expansion is caused by the contact, thus the portion 204 acting as an expansion part to effect the final expansion of the tube.

The downstream sealing portion 204 can also be embodied as an expandable portion, e.g., an inflatable portion, e.g., as an inflatable plug as is known in the art, allowing to vary the diameter thereof, e.g., to facilitate start-up of the installation with the diameter of portion 204 in the start-up phase being reduced, e.g., to at most the maximum diameter of part 200b. In combination with an expandable downstream sealing portion, the rigid run-off part as shown in FIG. 6 could e.g., be of reduced axial length, e.g., just sufficient for contact with the tube directly downstream of the maximum diameter of the part 200b, e.g., cylindrical having the same diameter as the maximum diameter. A slender rod could extend between the expandable portion 204 and the non-deformable body including at least the part 200b to hold the expandable portion in position.

Figure 7A:
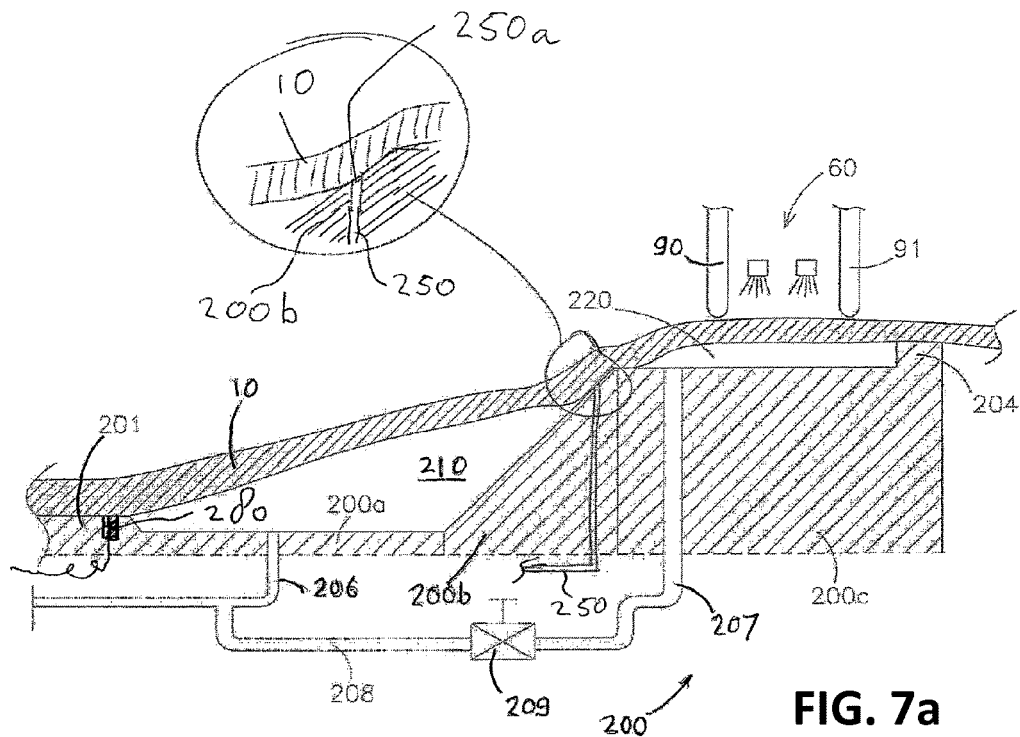
FIGS. 7a and 7b show schematically in longitudinal section a portion of an installation for producing biaxially oriented thermoplastic tubing to illustrate an exemplary embodiment of one aspect of the invention.
Figure 7B:
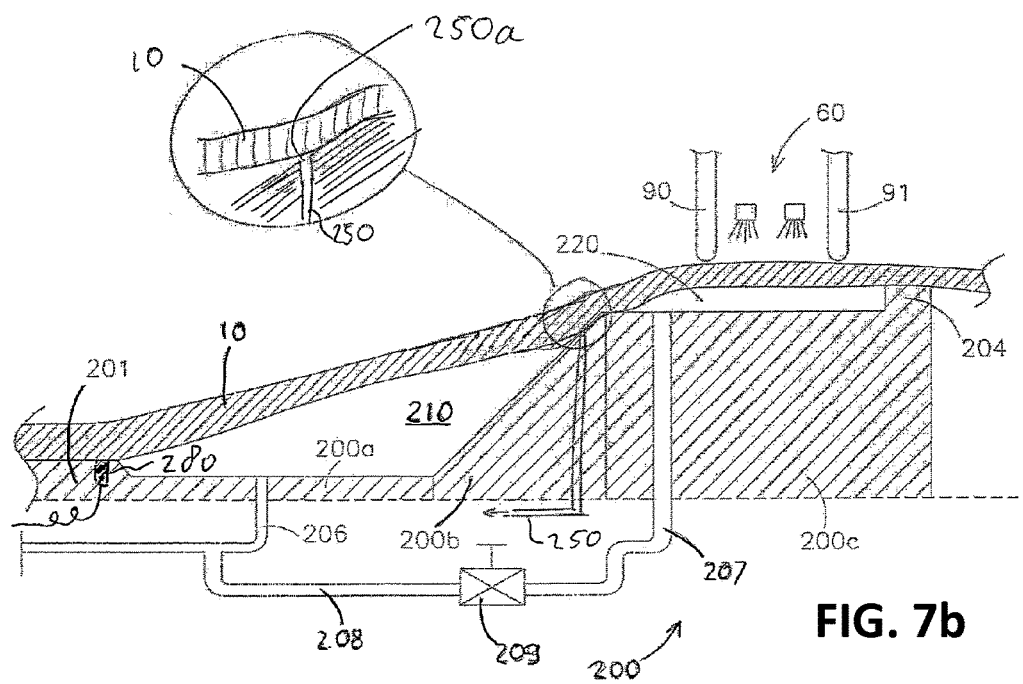
Figure 7C:
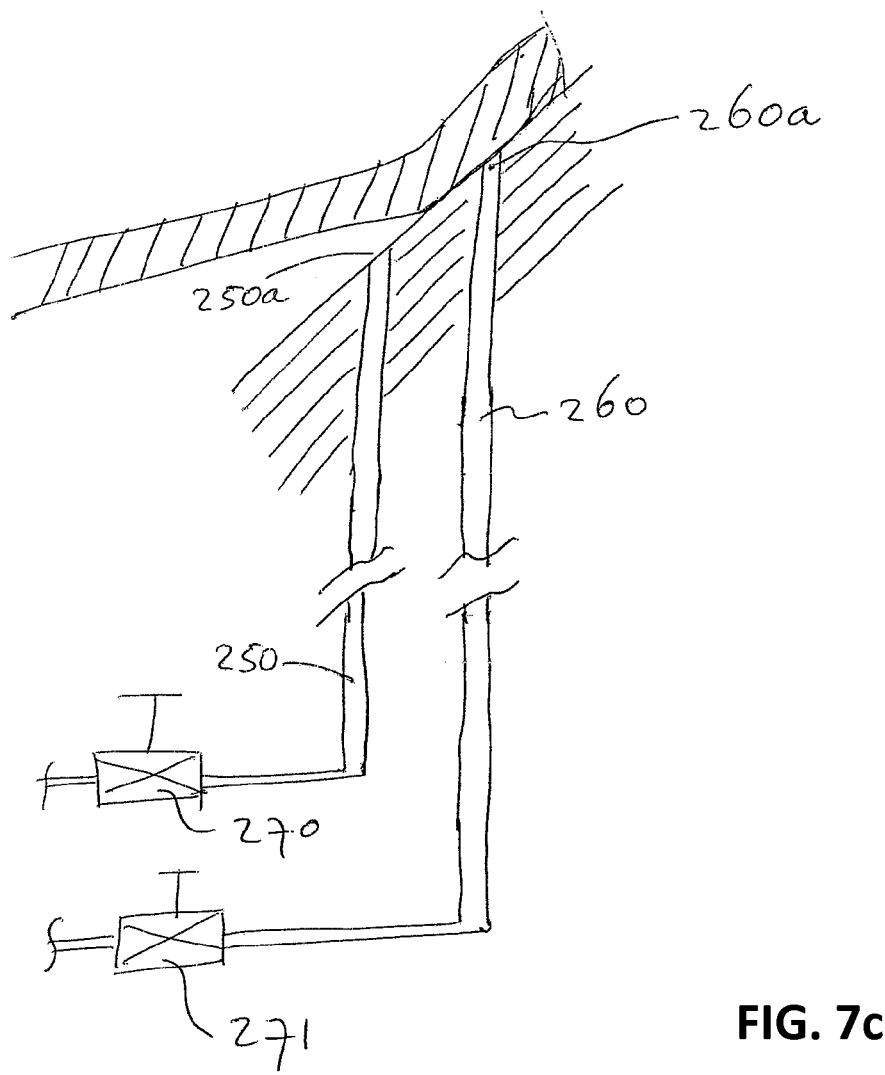
FIG. 7c shows a detail of a variant of the installation of FIGS. 7a and 7b.

In FIGS. 7a and 7b an installation is shown that largely corresponds to the installation shown in FIG. 6. Parts have the same or similar structure and function have been denoted with the same reference numerals. FIG. 7c shows a detail of a variant of the installation. In the expansion device 200 now also a gas discharge duct 250, which duct 250 has an inlet port 250a in the exterior surface of the expansion part of the expansion device, as can be seen in the enlarged detail of FIG. 7a.

In FIG. 7a the situation is shown wherein the inlet port 250a is covered and closed by the tube 10, so that the port 250a is not in communication with the gas volume 210.

In FIG. 7b the same installation is shown, but now the tube 10 has expanded some more under the influence of the gas pressure in volume 210. As can be seen in the enlarged detail, the port 250a is now not covered by the tube 10 and thus in communication with the gas volume 210.

The gas discharge duct 250 in FIG. 7b provides for the relief of gas pressure from the volume 201 as the corresponding inlet port is fully or at least partly open and thereby the expansion of the tube 10 caused by internal gas pressure is controlled.

This relief of gas pressure stops when the inlet port 250a is fully covered and closed by the tube 10 (as in FIG. 7a).

In practice an equilibrium situation may be reached wherein the port 250a remains partly open, so that a circulation of gas through the volume 210 is present.

So the cooperation of the tube 10 with the inlet port 250a achieves in a very attractive manner a control of the degree of expansion that is caused in the tube 10 due to the internal gas pressure in volume 210. Effectively the position of the inlet port 250a on the sloping exterior face of the expansion part of the device 200 controls where the tube 10 will contact the face, assuming that the gas pressure in volume 210 is sufficient to cause the tube 10 to expand.

The provision of duct 250 with inlet port 250a also provides for an automatic safety against the tube being expanded by gas pressure excessively, e.g., to a greater diameter that the expansion part prior to reaching the expansion part, which situation in reality would lead to a stoppage of the production.

It is noted that a group of multiple inlet ports 250a connected to a common gas discharge duct could be arranged distributed around the circumference of the expansion part and at the same radial distance to a central longitudinal axis of the expansion part, so as to avoid that the tube would over-expand somewhere along its circumference.

In another embodiment, shown in FIG. 7c, multiple inlet ports 250a, 250b, each associated with a corresponding discharge duct 250, 260, are provided at differing diameter positions in the exterior surface of the expansion part, the differing diameter positions having different radial distances from a central longitudinal axis of the expansion part (so in axial direction of the expansion device one inlet port behind the other inlet port). In this embodiment it is envisaged to provide one or more operable valves 270, 271 that are associated with the discharge ducts 250, 260, so that a selected inlet port and associated discharge duct can be made effective to relief gas pressure (here port 250a) when the tube does not cover and close the inlet port, whereas one or more non-selected inlet ports (here port 260a) and associated discharge ducts are made ineffective. This allows providing control over the internal diameter of the tube as it expands by the internal gas pressure in the fluid volume before reaching the non-deformable expansion part.

In FIG. 7a also a temperature sensor 280 is shown at the sealing member 201. This sensor 280 allows measuring the temperature of the preform in the region. This sensor 280 may e.g., be coupled to the first and/or second external heat exchange devices that are used to influence the sealing engagement of the preform with the sealing member 201 in order to assist in suitable operation thereof.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. An installation for producing a biaxially oriented tube from thermoplastic material comprising:
    an extruder with an extruder die head having an inner die member adapted to extrude a tube in preform condition from a thermoplastic material, the inner die member forming a lumen in the tube;
    one or more tempering devices for temperature conditioning the perform, so that a tempered tube in preform condition is obtained having an orientation temperature suitable for the thermoplastic material; and
    an expansion device downstream of the extruder, the expansion device comprising:
        a non-deformable expansion part having an increasing diameter to a maximum diameter at a downstream end of the expansion part, the expansion part being contacted by the tube and exerting an expanding force on the tube to expand the tempered tube in a circumferential direction;

a run-on part located upstream of the expansion part, the run-on part having an upstream nose end;

one or more fluid supply ducts having a port in the outer surface of the run-on part or the expansion part, so that a fluid volume is formable between the expansion device and the tube;

a drawing device downstream of the expansion device and adapted to act on the tube to transform the tube from a tube in preform condition into a biaxially oriented tube with thermoplastic material oriented in an axial direction and in a circumferential direction of the tube; and a cooling device adapted to cool the biaxially oriented tube;

wherein the run-on part is provided with a sealing member that is adapted to be sealingly engaged by the tube in preform condition, the sealing member being arranged upstream of the expansion part of the expansion device and having a diameter that is greater than the run-on part downstream of the sealing member, the sealing member forming an effective seal that prevents the fluid volume from reaching the lumen of the tube in preform condition upstream of the sealing member, and the sealing member being arranged at the nose-end of the run-on part; and wherein the installation is absent an external part at the height of the sealing member that presses the tube in preform condition onto the sealing member.

2. The installation of claim 1 further comprising one or more external heat exchange devices that are adapted to influence the temperature of the tube in preform condition and thereby the sealing engagement between the tube and the sealing member of the run-on part of the expansion device.

3. The installation of claim 2 further comprising:

a first heat exchange device arranged upstream of the sealing member of the run-on part, the first heat exchange device is being adapted for controlled external heat exchange with the tube in preform condition;

a second heat exchange device arranged downstream of the sealing member, the second heat exchange device being adapted for controlled external heat exchange with the tube in preform condition; and a control device for independent control of the first and second heat exchange devices.

4. The installation of claim 1, the expansion device further comprising one or more gas discharge ducts having one or more inlet ports in the exterior surface of the expansion part of the expansion device, an inlet port being open or closed dependent on whether or not the inlet port is covered by the tube, the gas discharge ducts being adapted to relieve gas pressure from the fluid volume when the one or more corresponding inlet ports are open, thereby reducing the expansion of the tube caused by internal gas pressure, the relief of gas pressure continuing until the one or more corresponding inlet ports are covered by the tube.

5. The installation of claim 4, the expansion device further comprising a plurality of inlet ports, each associated with a corresponding discharge duct, at differing diameter positions in the exterior surface of the expansion part, the differing diameter positions having different radial distances from a central longitudinal axis of the expansion part, wherein one or more operable valves are associated with the discharge ducts, wherein a selected inlet port and associated discharge duct are adapted to relieve gas pressure when the tube does not cover the inlet port, and one or more non-selected inlet ports and associated discharge ducts are made ineffective, thereby allowing for control over the internal diameter of the tube as it expands by the internal gas pressure in the fluid volume before reaching the non-deformable expansion part.

6. An installation for producing a biaxially oriented tube from thermoplastic material comprising:

an extruder with an extruder die head having an inner die member adapted to extrude a tube in preform condition from thermoplastic material, the inner die member being adapted to form a lumen in the tube;

one or more tempering devices downstream of the extruder and adapted for temperature conditioning the tube in preform condition;

an expansion device downstream of the one or more tempering devices, the expansion device comprising:

a non-deformable expansion part having a central longitudinal axis and an exterior surface with an increasing diameter to a maximum diameter at a downstream end thereof, which exterior surface is adapted to be contacted by the tube and to exert an expanding force on the tube so as to bring about an expansion of the tube in circumferential direction;

a run-on part located upstream of the expansion part, the run-on part having an upstream nose end, the nose end being provided with a sealing member adapted to seal the lumen of the tube in preform condition; and a gas supply duct, the gas supply duct having a port in an exterior surface of the run-on part or the expansion part;

a gas supply device adapted to supply pressurized gas to the gas supply duct in order to supply pressurized gas to a first gas volume between the expansion device and the tube, the first gas volume being sealed by the sealing member and by the tube contacting the exterior surface of the expansion part, the pressurized gas therein effecting a first gradual expansion of the tube; and a drawing device arranged downstream of the expansion device and is adapted to act on the tube and exert a tensile force on the tube;

wherein the expansion device is further provided with multiple gas discharge ducts, each gas discharge duct having an inlet port in the exterior surface of the expansion part;

wherein the length of each gas discharge duct comprises a portion defined within the expansion part by the distance from the central longitudinal axis of the expansion part to the exterior surface of the expansion part, the length of each gas discharge duct within the expansion part being thus dependent on the location of the inlet port, as the expansion part has an increasing diameter to a maximum diameter at the downstream end thereof; and wherein the installation comprises one or more valves associated with the multiple gas discharge ducts and adapted to selectively open and close a gas discharge duct in order to relief gas from the first gas volume via an opened gas discharge duct and thereby provide internal diameter control of the gradually expanding tube.

7. The installation of claim 6, wherein the expansion device comprises a non-deformable run-off part adjoining the downstream end of the expansion part, wherein the run-off part has a reduced diameter section and a non-deformable increased diameter portion delimiting a downstream end of the reduced diameter section, the increased diameter portion having a greater diameter than the reduced diameter section and greater than the maximum diameter of the expansion part, the increased diameter portion being adapted to sealingly engage the tube; and wherein the expansion device is further provided with one or more gas supply ducts having one or more ports in an exterior surface of the reduced diameter section and connected to the gas supply device in order to supply pressurized gas to a second gas volume between the reduced diameter section of the run-off part of the expansion device and the tube, the second gas volume being sealed by the tube contacting the expansion part and by the tube contacting the non-deformable increased diameter portion, the pressurized gas therein effecting a second gradual expansion of the tube.

8. The installation of claim 7, wherein the expansion device comprises a valve controlled passage in communication with the first gas volume and the second gas volume, the passage comprising a valve.

9. The installation of claim 7, wherein the installation comprises at least one outer diameter ring member that is arranged around and radially spaced from the reduced diameter section, the at least one outer diameter ring member having a length smaller than the reduced diameter section and being arranged such that the tube passes through the outer diameter ring member, wherein the at least one outer ring member is adapted to exert a constrictive force on the tube as the tube passes through the at least one outer ring member with the second gas volume avoiding seizing of the tube onto the reduced diameter section.

10. The installation of claim 9, wherein the installation comprises a displacement device adapted for axial displacement of the at least one outer diameter ring member in order to allow displacement thereof in axial direction relative to the run-off part.

11. The installation of claim 7, wherein the installation comprises two outer diameter ring members, which are each arranged around and radially spaced from the reduced diameter section, and wherein the outer ring members are spaced from one another in axial direction, each outer diameter ring member having a length smaller than the reduced diameter section and being arranged such that the tube passes through the outer diameter ring member, wherein each outer ring member is adapted to exert a constrictive force on the tube as the tube passes through the at least one outer ring member with the second gas volume avoiding seizing of the tube onto the reduced diameter section.

12. The installation of claim 7, wherein the installation comprises two outer diameter ring members, which are each arranged around and radially spaced from the reduced diameter section, and wherein the outer ring members are spaced from one another in axial direction, each outer diameter ring member having a length smaller than the reduced diameter section and being arranged such that the tube passes through the outer diameter ring member, wherein each outer ring member is adapted to exert a constrictive force on the tube as the tube passes through the at least one outer ring member with the second gas volume avoiding seizing of the tube onto the reduced diameter section; and wherein the installation comprises an external cooling device comprising one or more cooling liquid spray nozzles adapted to spray cooling liquid onto the tube between the two outer diameter ring members.

13. The installation of claim 12, wherein the installation comprises a displacement device adapted for axial displacement of each of the two outer diameter ring members in order to adjust the cooling of the tube by the external cooling device.

14. The installation of claim 9, wherein the at least one outer diameter ring member is composed of two semi-circular parts allowing to place the ring member around the tube.

15. The installation of claim 9, wherein the at least one outer diameter ring member comprises an internal cooling fluid duct in order to cool the ring member.

16. An installation for producing a biaxially oriented tube from thermoplastic material comprising:

an extruder with an extruder die head having an inner die member adapted to extrude a tube in preform condition from thermoplastic material, the inner die member being adapted to form a lumen in the tube;

one or more tempering devices downstream of the extruder and adapted for temperature conditioning the tube in preform condition;

an expansion device downstream of the one or more tempering devices, the expansion device comprising:

a non-deformable expansion part having a central longitudinal axis and an exterior surface with an increasing diameter to a maximum diameter at a downstream end thereof, which exterior surface is adapted to be contacted by the tube and to exert an expanding force on the tube so as to bring about an expansion of the tube in circumferential direction;

a run-on part located upstream of the expansion part, the run-on part having an upstream nose end, the nose end being provided with a sealing member adapted to seal the lumen of the tube in preform condition; and a non-deformable run-off part adjoining the downstream end of the expansion part, wherein the run-off part has a reduced diameter section and a non-deformable increased diameter portion delimiting a downstream end of the reduced diameter section, the increased diameter portion having a greater diameter than the reduced diameter section and greater than the maximum diameter of the expansion part, the increased diameter portion being adapted to sealingly engage the tube;

a gas supply duct, the gas supply duct having a port in an exterior surface of the run-on part or the expansion part;

a gas supply device adapted to supply pressurized gas to the gas supply duct in order to supply pressurized gas to a first gas volume between the expansion device and the tube, the first gas volume being sealed by the sealing member and by the tube contacting the exterior surface of the expansion part, the pressurized gas therein effecting a first gradual expansion of the tube; and a drawing device arranged downstream of the expansion device and is adapted to act on the tube and exert a tensile force on the tube;

wherein the expansion device is further provided with a gas supply duct having one or more ports in an exterior surface of the reduced diameter section and connected to the gas supply device in order to supply pressurized gas to a second gas volume between the reduced diameter section of the run-off part of the expansion device and the tube, the second gas volume being sealed by the tube contacting the expansion part and by the tube contacting the non-deformable increased diameter portion, the pressurized gas therein effecting a second gradual expansion of the tube.

17. The installation of claim 16, wherein the installation comprises at least one outer diameter ring member that is arranged around and radially spaced from the reduced diameter section, the at least one outer diameter ring member having a length smaller than the reduced diameter section and being arranged such that the tube passes through the outer diameter ring member, wherein the at least one outer ring member is adapted to exert a constrictive force on the tube as the tube passes through the at least one outer ring member with the second gas volume avoiding seizing of the tube onto the reduced diameter section.

18. The installation of claim 17, wherein the installation comprises a displacement device adapted for axial displacement of the at least one outer diameter ring member in order to allow displacement thereof in axial direction relative to the run-off part.

19. The installation of claim 17, wherein the installation comprises two outer diameter ring members, which are each arranged around and radially spaced from the reduced diameter section, and wherein the outer ring members are spaced from one another in axial direction, each outer diameter ring member having a length smaller than the reduced diameter section and being arranged such that the tube passes through the outer diameter ring member, wherein each outer ring member is adapted to exert a constrictive force on the tube as the tube passes through the at least one outer ring member with the second gas volume avoiding seizing of the tube onto the reduced diameter section.

20. The installation of claim 17, wherein the installation comprises two outer diameter ring members, which are each arranged around and radially spaced from the reduced diameter section, and wherein the outer ring members are spaced from one another in axial direction, each outer diameter ring member having a length smaller than the reduced diameter section and being arranged such that the tube passes through the outer diameter ring member, wherein each outer ring member is adapted to exert a constrictive force on the tube as the tube passes through the at least one outer ring member with the second gas volume avoiding seizing of the tube onto the reduced diameter section; and
  wherein the installation comprises an external cooling device comprising one or more cooling liquid spray nozzles adapted to spray cooling liquid onto the tube between the two outer diameter ring members.

21. An installation for producing a biaxially oriented tube from thermoplastic material comprising:
  an extruder with an extruder die head having an inner die member adapted to extrude a tube in preform condition from thermoplastic material, the inner die member being adapted to form a lumen in the tube;
  one or more tempering devices downstream of the extruder and adapted for temperature conditioning the tube in preform condition;
  an expansion device downstream of the one or more tempering devices, the expansion device comprising:
    a non-deformable expansion part having a central longitudinal axis and an exterior surface with an increasing diameter to a maximum diameter at a downstream end thereof, which exterior surface is adapted to be contacted by the tube and to exert an expanding force on the tube so as to bring about an expansion of the tube in circumferential direction;
    a run-on part located upstream of the expansion part, the run-on part having an upstream nose end, the nose end being provided with a sealing member adapted to seal the lumen of the tube in preform condition; and
    a non-deformable run-off part adjoining the downstream end of the expansion part, wherein the run-off part has a reduced diameter and a non-deformable increased diameter portion delimiting a downstream end of the reduced diameter section, the increased diameter portion having a greater diameter than the reduced diameter, the increased diameter portion being adapted to sealingly engage the tube;
  a gas supply duct, the gas supply duct having a port in an exterior surface of the run-on part or the expansion part;
  a gas supply device adapted to supply pressurized gas to the gas supply duct in order to supply pressurized gas to a first gas volume between the expansion device and the tube, the first gas volume being sealed by the sealing member and by the tube contacting the exterior surface of the expansion part, the pressurized gas therein effecting a first gradual expansion of the tube; and
  a drawing device arranged downstream of the expansion device and is adapted to act on the tube and exert a tensile force on the tube;
  wherein the expansion device is further provided with a gas supply duct having one or more ports in an exterior surface of the reduced diameter section and connected to the gas supply device in order to supply pressurized gas to a second gas volume between the reduced diameter section of the run-off part of the expansion device and the tube, the second gas volume being sealed by the tube contacting the expansion part and by the tube contacting the non-deformable increased diameter portion; and
  wherein the installation comprises at least one outer diameter ring member that is arranged around and radially spaced from the reduced diameter section, the at least one outer diameter ring member having a length smaller than the reduced diameter section and being arranged such that the tube passes through the outer diameter ring member, wherein the at least one outer ring member is adapted to exert a constrictive force on the tube as the tube passes through the at least one outer ring member with the second gas volume avoiding seizing of the tube onto the reduced diameter section, wherein the at least one outer ring member is arranged upstream of and adjacent the non-deformable increased diameter portion in order to enhance sealing contact between the tube and the non-deformable increased diameter portion.

22. An installation for producing a biaxially oriented tube from thermoplastic material comprising:
  an extruder with an extruder die head having an inner die member adapted to extrude a tube in preform condition from thermoplastic material, the inner die member being adapted to form a lumen in the tube;
  one or more tempering devices downstream of the extruder and adapted for temperature conditioning the tube in preform condition;
  an expansion device downstream of the one or more tempering devices, the expansion device comprising:
    a non-deformable expansion part having a central longitudinal axis and an exterior surface with an increasing diameter to a maximum diameter at a downstream end thereof, which exterior surface is adapted to be contacted by the tube and to exert an expanding force on the tube so as to bring about an expansion of the tube in circumferential direction;

a run-on part located upstream of the expansion part, the run-on part having an upstream nose end, the nose end being provided with a sealing member adapted to seal the lumen of the tube in preform condition;

a non-deformable run-off part adjoining the downstream end of the expansion part, wherein the run-off part has a reduced diameter section and a non-deformable increased diameter portion delimiting a downstream end of the reduced diameter section, the increased diameter portion having a greater diameter than the reduced diameter, the increased diameter portion being adapted to sealingly engage the tube; and a gas supply duct, the gas supply duct having a port in an exterior surface of the run-on part or the expansion part;

a gas supply device adapted to supply pressurized gas to the gas supply duct in order to supply pressurized gas to a first gas volume between the expansion device and the tube, the first gas volume being sealed by the sealing member and by the tube contacting the exterior surface of the expansion part, the pressurized gas therein effecting a first gradual expansion of the tube; and a drawing device arranged downstream of the expansion device and is adapted to act on the tube and exert a tensile force on the tube;

wherein the expansion device is further provided with a gas supply duct having one or more ports in an exterior surface of the reduced diameter section and connected to the gas supply device in order to supply pressurized gas to a second gas volume between the reduced diameter section of the run-off part of the expansion device and the tube, the second gas volume being sealed by the tube contacting the expansion part and by the tube contacting the non-deformable increased diameter portion; and wherein the installation comprises at least one outer diameter ring member that is arranged around and radially spaced from the reduced diameter section, the at least one outer diameter ring member having a length smaller than the reduced diameter section and being arranged such that the tube passes through the outer diameter ring member, wherein the at least one outer ring member is adapted to exert a constrictive force on the tube as the tube passes through the at least one outer ring member with the second gas volume avoiding seizing of the tube onto the reduced diameter section, wherein the at least one outer ring member is arranged adjacent the downstream end of the non-deformable expansion part in order to enhance sealing contact between the tube and the expansion device in a region thereof where the run-off part adjoins the expansion part.

* * * * *